(12) United States Patent
Tanaka

(10) Patent No.: US 10,278,199 B2
(45) Date of Patent: Apr. 30, 2019

(54) RADIO RELAY STATION, RADIO BASE STATION, COMMUNICATION SYSTEM AND COMMUNICATION METHOD

(71) Applicant: NEC Corporation, Minato-ku, Tokyo (JP)

(72) Inventor: Satoshi Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 15/515,725

(22) PCT Filed: Oct. 9, 2015

(86) PCT No.: PCT/JP2015/005127
§ 371 (c)(1),
(2) Date: Mar. 30, 2017

(87) PCT Pub. No.: WO2016/059782
PCT Pub. Date: Apr. 21, 2016

(65) Prior Publication Data
US 2017/0311338 A1 Oct. 26, 2017

(30) Foreign Application Priority Data
Oct. 15, 2014 (JP) .................. 2014-210873

(51) Int. Cl.
*H04W 72/12* (2009.01)
*H04W 16/26* (2009.01)
(Continued)

(52) U.S. Cl.
CPC .............. *H04W 72/12* (2013.01); *H04B 7/14* (2013.01); *H04W 16/26* (2013.01);
(Continued)

(58) Field of Classification Search
CPC . H04W 16/26; H04W 72/12; H04W 28/0278; H04W 84/047; H04W 72/1263;
(Continued)

(56) References Cited

U.S. PATENT DOCUMENTS 8,620,326 B2 * 12/2013 Zhang ..................... H04B 7/155
455/436
8,649,348 B2 * 2/2014 Huang ................. H04B 7/2606
370/315

(Continued)

FOREIGN PATENT DOCUMENTS

RU 2396709 C2 8/2010
WO 2006/030913 A1 3/2006
(Continued)

OTHER PUBLICATIONS

Russian Office Action for RU Application No. 2017116226/07 dated Oct. 26, 2017 with English Translation.
(Continued)

*Primary Examiner* — Man U Phan

(57) ABSTRACT

In order to achieve a more efficient data transmission, an RN 200, which is to relay communications between UE 300 and a DeNB 100, notifies, in advance, the DeNB 100 of a timing at which RN 200 can transmit, to the DeNB 100, upstream data received from the UE 300, and thereafter the RN 200 transmits the upstream data to the DeNB 100.

5 Claims, 22 Drawing Sheets

(51) Int. Cl.
*H04B 7/14* (2006.01)
*H04W 28/02* (2009.01)
*H04W 72/04* (2009.01)
*H04W 88/08* (2009.01)
*H04W 84/04* (2009.01)

(52) U.S. Cl.
CPC ... *H04W 28/0278* (2013.01); *H04W 72/0413* (2013.01); *H04W 72/1263* (2013.01); *H04W 72/1284* (2013.01); *H04W 84/047* (2013.01); *H04W 88/08* (2013.01)

(58) Field of Classification Search
CPC ............. H04W 88/08; H04W 72/1284; H04W 72/0413; H04B 7/14
USPC .......................................................... 370/315
See application file for complete search history.

(56) References Cited

U.S. PATENT DOCUMENTS

| | | | | |
|---|---|---|---|---|
| 8,655,268 B2* | 2/2014 | Suga | ...................... | H04B 7/155 370/315 |
| 8,688,031 B2* | 4/2014 | Suga | ...................... | H04B 7/155 455/11.1 |
| 9,037,076 B2* | 5/2015 | Nagata | ................ | H04W 84/047 455/7 |
| 9,351,160 B2* | 5/2016 | Chen | ..................... | H04W 12/04 |
| 2008/0043647 A1* | 2/2008 | Yoshida | ............. | H04B 7/155 370/280 |
| 2008/0045145 A1* | 2/2008 | Nakatsugawa | ........ | H04B 7/155 455/11.1 |
| 2009/0061920 A1 | 3/2009 | Horiuchi et al. | | |
| 2010/0302946 A1 | 12/2010 | Yang et al. | | |
| 2011/0053496 A1* | 3/2011 | Hui | ........................ | H04B 7/155 455/9 |
| 2011/0243060 A1 | 10/2011 | Mildh et al. | | |
| 2011/0269393 A1 | 11/2011 | Oestergaard et al. | | |
| 2013/0051254 A1 | 2/2013 | Wilhelmsson et al. | | |
| 2013/0115953 A1* | 5/2013 | Fukuta | ................... | H04B 7/155 455/436 |
| 2015/0109991 A1* | 4/2015 | Miyazaki | ................ | H04W 4/00 370/315 |

FOREIGN PATENT DOCUMENTS

| | | |
|---|---|---|
| WO | 2008/050425 A1 | 5/2008 |
| WO | 2009/091182 A2 | 7/2009 |
| WO | 2012/093428 A1 | 7/2012 |
| WO | 2012/147295 A1 | 11/2012 |

OTHER PUBLICATIONS

Extended European Search Report for EP Application No. EP15849906.1 dated May 18, 2018.
Japanese Office Action for JP Application No. 2016-553965 dated Jun. 12, 2018 with English Translation.
International Search Report for PCT Application No. PCT/JP2015/005127, dated Dec. 8, 2015.
English translation of Written opinion for PCT Application No. PCT/JP2015/005127.

* cited by examiner

RADIO RELAY STATION, RADIO BASE STATION, COMMUNICATION SYSTEM AND COMMUNICATION METHOD

This application is a National Stage Entry of PCT/JP2015/005127 filed on Oct. 9, 2015, which claims priority from Japanese Patent Application 2014-210873 filed on Oct. 15, 2014, the contents of all of which are incorporated herein by reference, in their entirety.

TECHNICAL FIELD

The present invention relates to a radio relay station, a radio base station, a communication system, and a communication method that perform communication.

BACKGROUND ART

In recent years, in order to substantially widen a cover area of a radio base station or to maintain an electric field strength of received signals at a communication terminal, a technology in which a radio relay station connected to a radio base station is provided and the radio relay station is caused to relay communications between the radio base station and a communication terminal has been considered.

FIG. 21 is a diagram illustrating one form of a common radio communication system provided with a relay apparatus.

The radio communication system illustrated in FIG. 21 is composed of DeNBs (Donor evolved Node Bs) 1000-1 and 1000-2 that are radio base stations, an RN (Relay Node) 2000 that is a radio relay station, and UEs (User Equipments) 3000-1 and 3000-2 that are communication terminals.

The RN 2000 relays communication between the DeNB 1000-1 and the UE 3000-1.

Furthermore, the RN 2000 relays communication between the DeNB 1000-2 and the UE 3000-2.

Furthermore, a technology in which, when, in a radio relay station as described above, a downlink line control signal is sent from a radio base station to the radio relay station at a timing at which the radio relay station is sending a downlink line control signal to a communication terminal, the radio relay station allocates a resource region that can receive the downlink line control signal sent from the radio base station has been considered (refer to, e.g., PTL 1).

CITATION LIST

Patent Literature

[PTL 1] International Publication No. WO 2012/147295

SUMMARY OF INVENTION

Technical Problem

Hereinafter, processing in the radio communication system illustrated in FIG. 21 will be described.

FIG. 22 is a sequence chart for describing an example of uplink data transmission processing in the radio communication system illustrated in FIG. 21.

Firstly, the UE 3000-1 sends, to the RN 2000, an uplink scheduling request signal (SR_a) for sending uplink data to the DeNB 1000-1. Then, the RN 2000 sends, as a response signal therefor, an uplink scheduling information signal (UL_Grant for SR_a) to the UE 3000-1. Subsequently, the UE 3000-1 sends, to the RN 2000, an uplink buffer status-reporting signal (BSR_a) indicating a storage status of a buffer that temporarily stores uplink data. Then, the RN 2000 sends a response signal (UL_Grant for BSR_a) thereto for to the UE 3000-1. When receiving the UL_Grant for BSR_a, the UE 3000-1 sends, to the RN 2000, uplink data (UL_Data_a) that are to be sent to the DeNB 1000-1. After receiving the UL_Data_a from the UE 3000-1, the RN 2000 sends an SR_a to the DeNB 1000-1.

Furthermore, the UE 3000-2 sends, to the RN 2000, an uplink scheduling request signal (SR_b) for sending uplink data to the DeNB 1000-2. Then, the RN 2000 sends, as a response signal therefor, an uplink scheduling information signal (UL_Grant for SR_b) to the UE 3000-2. Subsequently, the UE 3000-2 sends, to the RN 2000, an uplink buffer status-reporting signal (BSR_b) that indicates a storage status of a buffer that temporarily stores uplink data. Then, the RN 2000 sends a response signal (UL_Grant for BSR_b) therefor to the UE 3000-2. When receiving the UL_Grant for BSR_b, the UE 3000-2 sends, to the RN 2000, uplink data (UL_Data_b) that are to be sent to the DeNB 1000-2. After receiving the UL_Data_b from the UE 3000-2, the RN 2000 sends an SR_b to the DeNB 1000-2.

After that, when, simultaneously with the DeNB 1000-1 sending the UL_Grant for SR_a to the RN 2000, the DeNB 1000-2 sends the UL_Grant for SR_b to the RN 2000, the RN 2000 can perform reception processing of only one of the uplink scheduling information signals. Furthermore, even when the RN 2000 attempts to simultaneously perform sending of the BSR_a to the DeNB 1000-1 and sending of the BSR_b to the DeNB 1000-2, the RN 2000 can send the uplink buffer status-reporting signal for only one thereof.

Furthermore, when the DeNB 1000-2 sends the UL_Grant for BSR_b to the RN 2000 simultaneously with the DeNB 1000-1 sending the UL_Grant for BSR_a to the RN 2000, the RN 2000 can only perform reception processing of only one thereof. Furthermore, even when the RN 2000 attempts to simultaneously perform transmission of the UL_Data_a to the DeNB 1000-1 and transmission of the UL_Data_b to the DeNB 1000-2, the RN 2000 can send only the uplink data to one thereof.

Thus, in some cases, timings at which signals are sent to or received from a plurality of radio base stations are simultaneous. For example, when transmission/reception of such signals between the RN 2000 and the DeNB 1000-2 cannot be carried out, retransmission processing for these signals is performed with the DeNB 1000-2, resulting in a problem of delayed uplink data transmission.

FIG. 23 is a sequence chart for describing another example of the uplink data transmission processing in the radio communication system illustrated in FIG. 21. In FIG. 23, a procedure until the RN 2000 attempts to perform simultaneously sending of the UL_Data_a to the DeNB 1000-1 and sending of the UL_Data_b to the DeNB 1000-2 is substantially the same as a procedure in FIG. 22. In FIG. 23, a case where a packet is subsequently discarded will be described.

FIG. 23 illustrates a case where, when timings at which signals are sent to or received from a plurality of radio base stations become simultaneous and, therefore, for example, the RN 2000 cannot perform transmission/reception of such signals to/from the DeNB 1000-2, a packet (uplink data) related to delay is discarded. For example, when the RN 2000 cannot send uplink data to the DeNB 1000-2 and, therefore, an amount of time for which the uplink data are buffered within the RN 2000 runs out, the buffered uplink data are discarded. Then, transmission/reception of the signals are performed between the UE 3000-2 and the RN 2000 again, retransmission processing for these signals is performed between the RN 2000 and the DeNB 1000-2, resulting in a problem of the uplink data transmission being delayed.

FIG. 24 is a sequence chart for describing an example of downlink data transmission processing performed by the radio communication system illustrated in FIG. 21.

When the DeNB 1000-2 sends downlink data (DL_Data_b) to the RN 2000 simultaneously with the DeNB 1000-1 sending downlink data (DL_Data_a) to the RN 2000, the RN 2000 can perform reception processing for the downlink data from only one of the DeNB 1000-2 and the DeNB 1000-1. For example, when the RN 2000 has performed only reception processing of the DL_Data_a sent from the DeNB 1000-1, the RN 2000 sends the DL_Data_a to the UE 3000-1. Then, as a response to receiving the downlink data, the UE 3000-1 sends an Ack(HARQ)_a to the RN 2000.

After receiving the Ack(HARQ)_a from the UE 3000-1, the RN 2000 sends the Ack(HARQ)_a to the DeNB 1000-1. On the other hand, since the RN 2000 has not received the downlink data from the DeNB 1000-2, the RN 2000 sends, to the DeNB 1000-2, a Nack(HARQ)_b that is a signal indicating that the RN 2000 has not received the downlink data from the DeNB 1000-2.

Then, the DeNB 1000-2 resends, to the RN 2000, the downlink data (DL_Data_b) to be sent to the UE 3000-2. When receiving the DL_Data_b from the DeNB 1000-2, the RN 2000 sends the DL_Data_b to the UE 3000-2.

Thus, the downlink data transmission has a problem of being delayed by simultaneous transmission, as is the case with the uplink data transmission.

Furthermore, the technology described in PTL 1 is merely a technology that carries out allocation of resource regions and, as is the case with the foregoing configuration, has a problem of being incapable of preventing data transmission delay caused by simultaneous sending to or simultaneous reception from a plurality of nodes.

An object of the present invention is to provide a radio relay station, a radio base station, a communication system, and a communication method that solve the problems stated above.

Solution to Problem

A radio relay station according to the present invention includes a transmission means for notifying a radio base station of a timing at which uplink data sent from a communication terminal are able to be sent to the radio base station and then sending the uplink data to the radio base station.

Furthermore, a radio base station according to the present invention includes a transmission means for notifying a radio relay station that relays communication with a communication terminal of a timing at which downlink data are able to be sent to the radio relay station and then sending the downlink data to the radio relay station.

Furthermore, a communication system according to the present invention is a communication system that includes a radio base station and a radio relay station that relays communication between the radio base station and a communication terminal, wherein the radio relay station includes a transmission means for notifying the radio base station of a timing at which uplink data sent from the communication terminal are able to be sent to the radio base station and then sending the uplink data to the radio base station.

Furthermore, a communication system according to the present invention is a communication system that includes a radio base station and a radio relay station that relays communication between the radio base station and a communication terminal, wherein the radio base station includes a transmission means for notifying the radio relay station of a timing at which downlink data are able to be sent to the radio relay station and then sending the downlink data to the radio relay station.

Furthermore, a communication method according to the present invention includes notifying a radio base station of a timing at which uplink data sent from a communication terminal are able to be sent to the radio base station and then sending the uplink data to the radio base station.

Furthermore, a communication method according to the present invention includes notifying a radio relay station that relays communication with a communication terminal of a timing at which downlink data are able to be sent to the radio relay station and then sending the downlink data to the radio relay station.

Furthermore, a communication method according to the present invention is a communication method in a communication system that includes a radio base station and a radio relay station that relays communication between the radio base station and a communication terminal, and includes, by the radio relay station, notifying the radio base station of a timing at which uplink data sent from the communication terminal are able to be sent to the radio base station and then sending the uplink data to the radio base station.

Furthermore, a communication method according to the present invention is a communication method in a communication system that includes a radio base station and a radio relay station that relays communication between the radio base station and a communication terminal, and includes, by the radio base station, performing processing of notifying the radio relay station of a timing at which downlink data are able to be sent to the radio relay station and then sending the downlink data to the radio relay station.

Advantageous Effects of Invention

As described above, in the present invention, data transmission can be made more efficient.

DESCRIPTION OF EMBODIMENTS

Hereinafter, example embodiments of the present invention will be described with reference to the drawings.

First Example Embodiment

Figure 1:
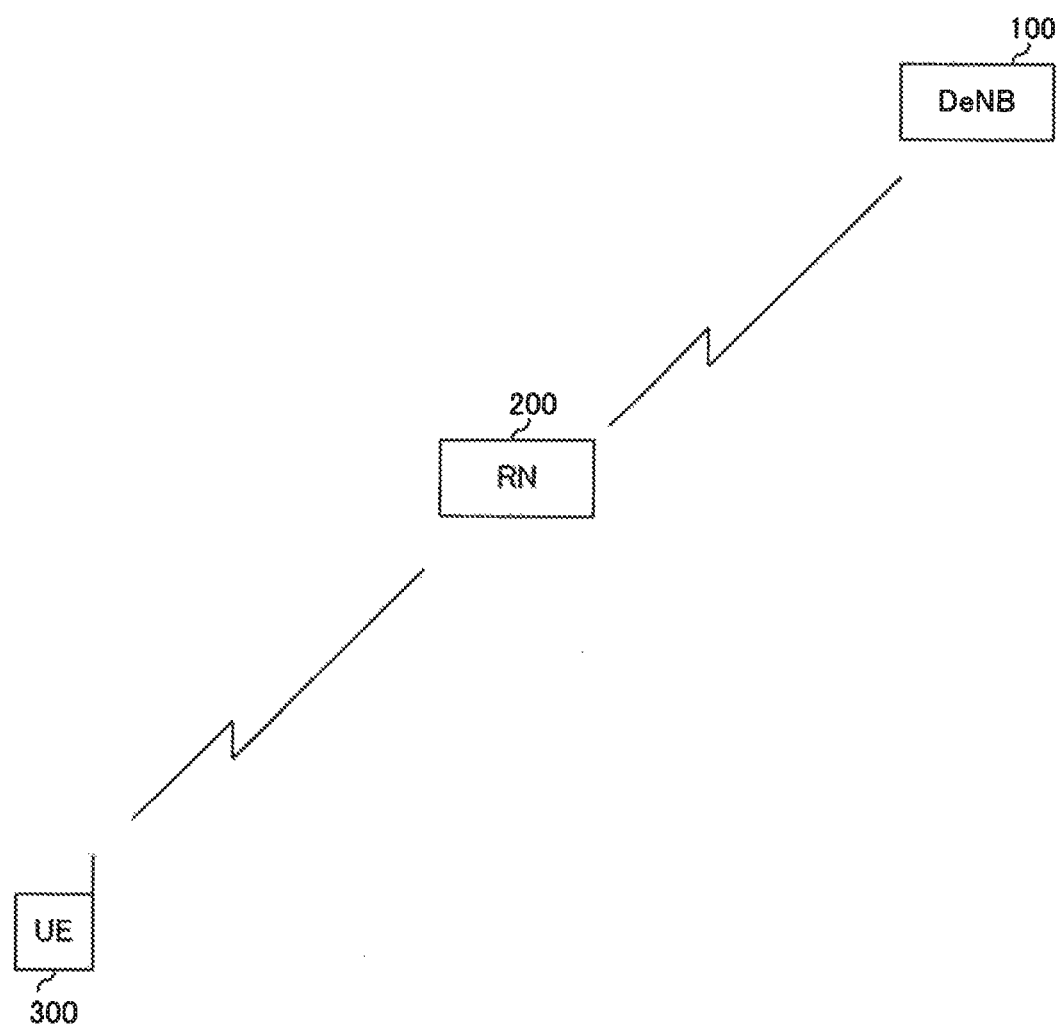
FIG. 1 is a diagram illustrating a first example embodiment of the communication system of the present invention.

FIG. 1 is a diagram illustrating a first example embodiment of the communication system of the present invention. A communication system in this example embodiment, as illustrated in FIG. 1, includes a DeNB 100, an RN 200, and a UE 300. The DeNB 100 is a radio base station that communicates with the UE 300 via the RN 200. The RN 200 is a radio relay station that relays communication between the DeNB 100 and the UE 300. The UE 300 is a communication terminal that communicates with the DeNB 100 via the RN 200.

Figure 2:
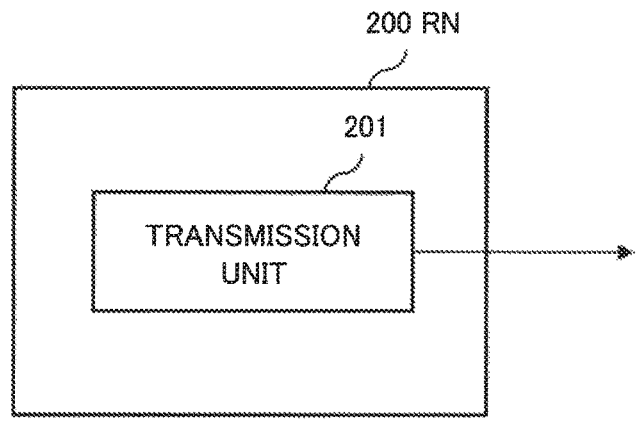
FIG. 2 is a diagram illustrating an example of an internal structure of an RN illustrated in FIG. 1.

FIG. 2 is a diagram illustrating an example of an internal structure of the RN 200 illustrated in FIG. 1. The RN 200 illustrated in FIG. 1 includes a transmission unit 201 as illustrated in FIG. 2. Note that FIG. 2 illustrates only structural elements concerning this example embodiment, of structural elements that the RN 200 illustrated in FIG. 1 includes.

The transmission unit 201 sends to the DeNB 100 uplink data sent from the UE 300. At this time, the transmission unit 201 notifies the DeNB 100 of the timing at which the uplink data sent from the UE 300 can be sent to the DeNB 100 and then sends the uplink data to the DeNB 100. Note that in each block diagram in the present application, an arrow provided for a block indicates only a propagating direction of a signal that corresponds to a description and does not limit the propagating directions of other signals.

Figure 3:
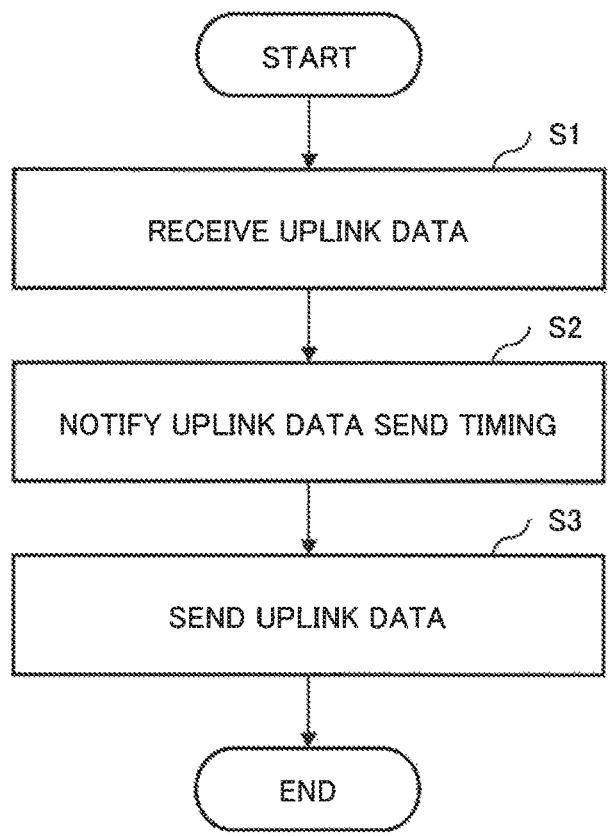
FIG. 3 is a flowchart for describing an example of a communication method in the communication system illustrated in FIG. 1.

Hereinafter, a communication method in the communication system illustrated in FIG. 1 will be described. FIG. 3 is a flowchart for describing an example of the communication method in the communication system illustrated in FIG. 1. First, when the RN 200 receives uplink data sent from the UE 300 (step S1), the transmission unit 201 notifies the DeNB 100 of timing at which the transmission unit 201 can send the uplink data (step S2). After that, at that timing, the transmission unit 201 sends the uplink data to the DeNB 100 (step S3). In this manner, the radio relay station notifies the radio base station of the timing at which the radio relay station can send the uplink data, and then sends the uplink data to the radio base station at the timing. Therefore, the communication system of the first example embodiment can prevent failure in sending the uplink data and therefore can make the data transmission more efficient.

Second Example Embodiment

Figure 4:
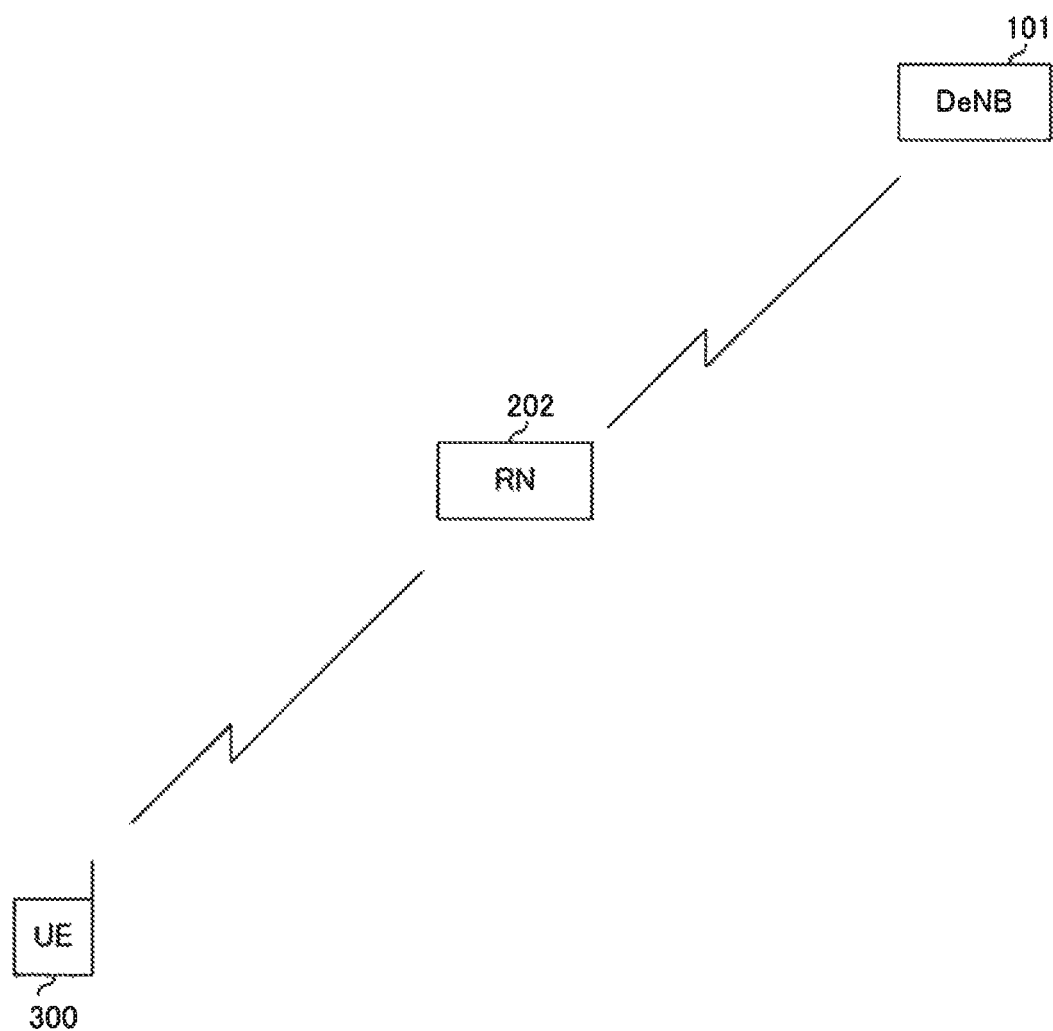
FIG. 4 is a diagram illustrating a second example embodiment of the communication system of the present invention.

FIG. 4 is a diagram illustrating a second example embodiment of the communication system of the present invention. The communication system in this example embodiment includes a DeNB 101, an RN 202, and a UE 300 as illustrated in FIG. 4. The DeNB 101 is a radio base station that communicates with the UE 300 via the RN 202. The RN 202 is a radio relay station that relays communication between the DeNB 101 and the UE 300. The UE 300 is a communication terminal that communicates with the DeNB 101 via the RN 202.

Figure 5:
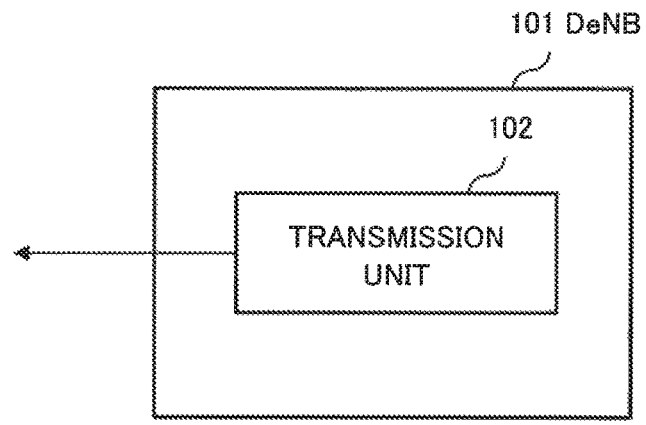
FIG. 5 is a diagram illustrating an example of an internal structure of a DeNB illustrated in FIG. 4.

FIG. 5 is a diagram illustrating an example of an internal structure of the DeNB 101 illustrated in FIG. 4. The DeNB 101 illustrated in FIG. 4 includes a transmission unit 102 as illustrated in FIG. 5. Note that FIG. 5 illustrates only structural elements concerning this example embodiment, of the structural elements that the DeNB 101 illustrated in FIG. 4 includes. The transmission unit 102 notifies the RN 202 of the timing at which downlink data can be sent to the RN 202 and then sends the downlink data to the RN 202.

Figure 6:
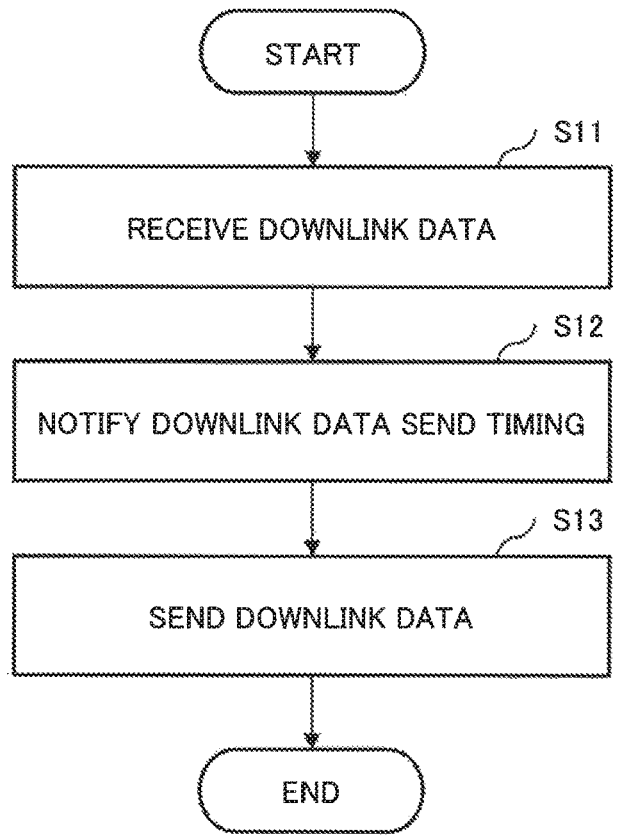
FIG. 6 is a flowchart for describing an example of a communication method in the communication system illustrated in FIG. 4.

Hereinafter, a communication method in the communication system illustrated in FIG. 4 will be described. FIG. 6 is a flowchart for describing an example of the communication method in the communication system illustrated in FIG. 4. First, when the DeNB 101 receives downlink data sent from a higher-order apparatus (e.g., a SGW (Serving Gateway)) of the DeNB 101 (step S11), the transmission unit 102 notifies the RN 202 of the timing at which downlink data can be sent (step S12). After that, the transmission unit 102, at that timing, sends the downlink data to the RN 202 (step S13).

Thus, the radio base station notifies the radio relay station of the timing at which the station can send downlink data, and then, at that timing, sends the downlink data to the radio relay station. Therefore, the communication system of the second example embodiment can prevent failure in sending downlink data and therefore can make data transmission more efficient.

Third Example Embodiment

Figure 7:
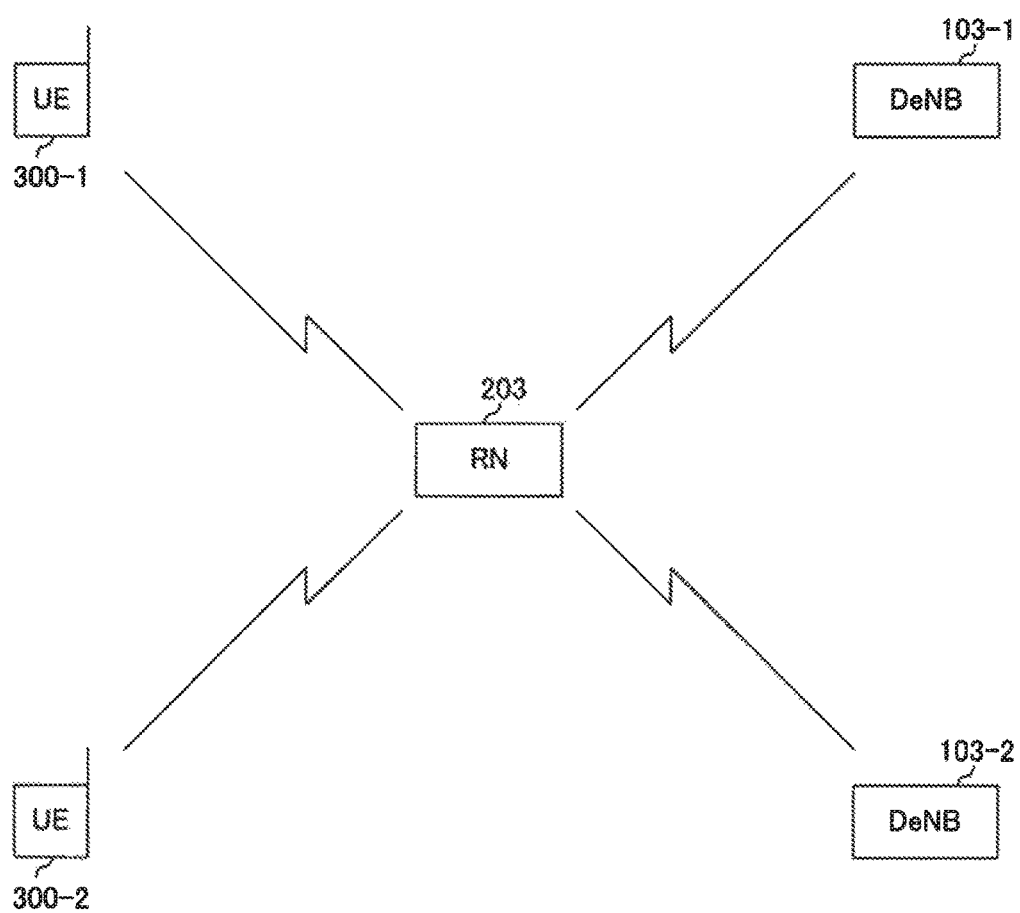
FIG. 7 is a diagram illustrating a third example embodiment of the communication system of present invention.

FIG. 7 is a diagram illustrating a third example embodiment of the communication system of the present invention. The communication system in this example embodiment, as illustrated in FIG. 7, includes DeNBs 103-1 and 103-2, the RN 203, and UEs 300-1 and 300-2. The DeNB 103-1 is a radio base station that communicates with the UE 300-1 via the RN 203. The DeNB 103-2 is a radio base station that communicates with the UE 300-2 via the RN 203. The RN 203 is a radio relay station that relays communication between the DeNB 103-1 and the UE 300-1 and communication between the DeNB 103-2 and the UE 300-2. Furthermore, the RN 203 sends uplink signals to the DeNBs 103-1 and 103-2 by using a communication method of SC-FDMA or TD-SCDMA. The SC-FDMA is an abbreviation of "Single Carrier-Frequency Division Multiple Access" and TD-SCDMA is an abbreviation of "Time Division-Synchronous Code Division Multiple Access". The UE 300-1 is a communication terminal that communicates with the DeNB 103-1 via the RN 203. The UE 300-2 is a communication terminal that communicates with the DeNB 103-2 via the RN 203.

Figure 8:
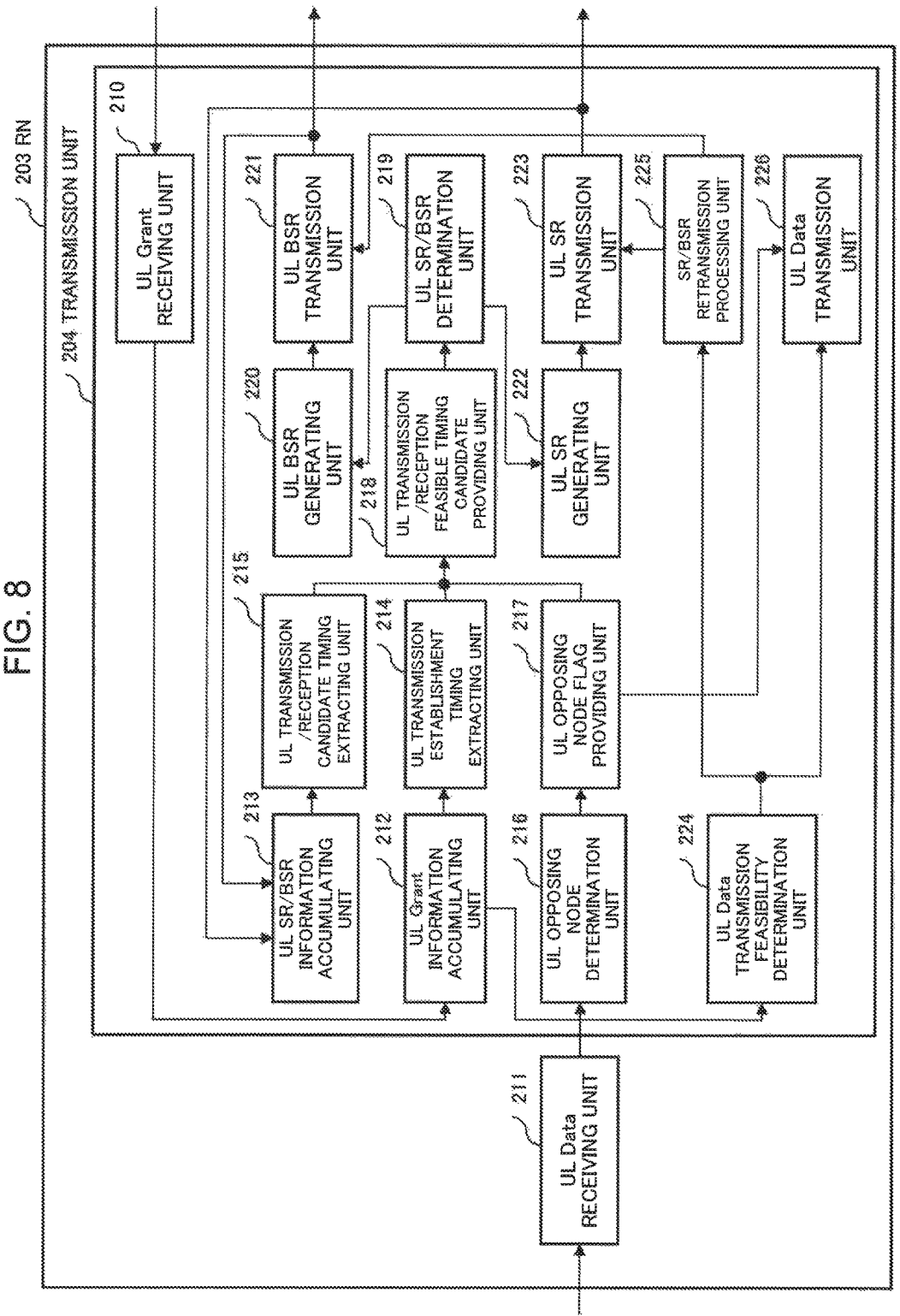
FIG. 8 is a diagram illustrating an example of an internal structure of an RN illustrated in FIG. 7.

FIG. 8 is a diagram illustrating an example of an internal structure of the RN 203 illustrated in FIG. 7.

The RN 203 illustrated in FIG. 7 includes a transmission unit 204 and a UL Data receiving unit 211, as illustrated in FIG. 8. Furthermore, the transmission unit 204 includes a UL Grant receiving unit 210, a UL Grant information accumulating unit 212, a UL SR/BSR information accumulating unit 213, a UL transmission establishment timing extracting unit 214, a UL transmission/reception candidate timing extracting unit 215, a UL opposing node determination unit 216, a UL opposing node flag providing unit 217, a UL transmission/reception feasible timing candidate providing unit 218, a UL SR/BSR determination unit 219, a UL BSR generating unit 220, a UL BSR transmission unit 221, a UL SR generating unit 222, a UL SR transmission unit 223, a UL Data transmission feasibility determination unit 224, an SR/BSR retransmission processing unit 225, and a UL Data transmission unit 226. Note that FIG. 8 illustrates only structural elements concerning this example embodiment, of the structural elements that the RN 203 illustrated in FIG. 7 includes.

The UL Data receiving unit 211 receives uplink data sent from the UEs 300-1 and 300-2 and outputs the received uplink data to the UL opposing node determination unit 216.

The UL Grant receiving unit 210 receives response signals (UL Grant), such as uplink scheduling information, that are sent from the DeNBs 103-1 and 103-2, and outputs the signals to the UL Grant information accumulating unit 212.

The UL Grant information accumulating unit 212 accumulates the UL Grant that have been output from the UL Grant receiving unit 210.

The UL SR/BSR information accumulating unit 213 accumulates reception timing information regarding UL Grant and send timing information regarding an uplink buffer status report (UL Buffer Status Report, referred to hereinafter as UL BSR) signal contained in an uplink scheduling request (UL Scheduling Request, referred to hereinafter as UL SR) signal that has already been sent from the UL SR transmission unit 223. Furthermore, the UL SR/BSR information accumulating unit 213 accumulates the reception timing information regarding UL Grant and the send timing information regarding uplink data (UL Data) contained in the UL BSR that has already been sent from the UL BSR transmission unit 221.

The UL transmission establishment timing extracting unit 214 extracts a send feasible timing candidate for UL BSR that is to be contained in UL SR, based on the UL Grant accumulated in the UL Grant information accumulating unit 212. Furthermore, the UL transmission establishment timing extracting unit 214 extracts a send feasible timing candidate for UL Data that is to be contained in UL BSR, based on the UL Grant accumulated in the UL Grant information accumulating unit 212.

The UL transmission/reception candidate timing extracting unit 215 refers to the reception timing for UL Grant and the transmission timing candidate for sending UL BSR contained in the UL SR accumulated in the UL SR/BSR information accumulating unit 213. Furthermore, the UL transmission/reception candidate timing extracting unit 215 refers to the reception timing for the UL Grant and the send timing candidate for sending UL Data contained in the UL BSR accumulated in the UL SR/BSR information accumulating unit 213. Then, the UL transmission/reception candidate timing extracting unit 215 extracts, from these timings referred to, a send timing candidate for next UL BSR/UL Data that can be sent by the UL SR/BSR and a reception timing candidate for receiving a UL Grant for sending the UL BSR/UL Data.

The UL opposing node determination unit 216 determines an opposing node. Concretely, the UL opposing node determination unit 216 determines whether the opposing node is the DeNB 103-1 or 103-2 or a higher-order apparatus such as a SGW. In this example embodiment, because the transmission unit 204 is packaged in the RN 203, the UL opposing node determination unit 216 determines that the opposing node is the DeNB 103-1 or 103-2. On the other hand, in the case where the transmission unit 204 is packaged in the DeNB 103-1 or the DeNB 103-2, the UL opposing node determination unit 216 determines that the opposing node is an SGW that is a higher-order apparatus above the DeNBs 103-1 and the DeNB 103-2.

The UL opposing node flag providing unit 217 provides a flag according to a result of determination by the UL opposing node determination unit 216.

The UL transmission/reception feasible timing candidate providing unit 218, based on information extracted by the UL transmission establishment timing extracting unit 214 and the UL transmission/reception candidate timing extracting unit 215, provides a send feasible timing candidate for a UL BSR contained in the UL SR and a reception feasible timing candidate for the UL Grant. Furthermore, the UL transmission/reception feasible timing candidate providing unit 218, based on information extracted by the UL transmission establishment timing extracting unit 214 and the UL transmission/reception candidate timing extracting unit 215, provides a send feasible timing candidate for UL Data that is to be contained in the UL BSR and a reception feasible timing candidate for the UL Grant.

Based on the UL Grant, the UL SR/BSR determination unit 219 determines which one of the UL SR and the UL BSR is the signal that is to be sent next.

When the UL SR/BSR determination unit 219 has determined that the signal to be sent next is a UL BSR, the UL BSR generating unit 220 generates a UL BSR in which the timing information is contained.

The UL BSR transmission unit 221 is an uplink buffer status-reporting signal transmission unit that sends the UL BSR generated by the UL BSR generating unit 220 to the DeNBs 103-1 and 103-2. In other words, the UL BSR transmission unit 221, when sending the UL BSR to the DeNBs 103-1 and 103-2, sends the UL BSR in which information indicating the timing at which a UL Grant for the UL BSR can be received and information indicating a timing at which the UL Data can be sent to the DeNBs 103-1 and 103-2 are contained.

The UL SR generating unit 222 generates a UL SR in which the timing information is contained, when the UL SR/BSR determination unit 219 has determined that the signal to be sent next is a UL SR.

The UL SR transmission unit 223 is an uplink scheduling request signal transmission unit that sends the UL SR generated by the UL SR generating unit 222 to the DeNBs 103-1 and 103-2. In other words, the UL SR transmission unit 223, when sending the UL SR to the DeNBs 103-1 and 103-2, sends a UL SR in which information indicating the timing at which the UL Grant for the UL SR can be received and information indicating the timing at which the UL BSR can be sent to the DeNBs 103-1 and 103-2 are contained.

The UL Data transmission feasibility determination unit 224 determines whether the sending of the UL Data is feasible, based on the UL Grant accumulated in the UL Grant information accumulating unit 212. Concretely, the UL Data transmission feasibility determination unit 224 determines whether the sending of the UL Data is feasible, based on the send timing notified by the UL Grant accumulated by the UL Grant information accumulating unit 212.

The SR/BSR retransmission processing unit 225 performs retransmission processing for the UL SR and the UL BSR when the UL Data transmission feasibility determination unit 224 has determined that the UL Data cannot be sent.

The UL Data transmission unit 226 sends the UL Data to the DeNBs 103-1 and 103-2 when the UL Data transmission feasibility determination unit 224 has determined that the UL Data can be sent.

Figure 9:
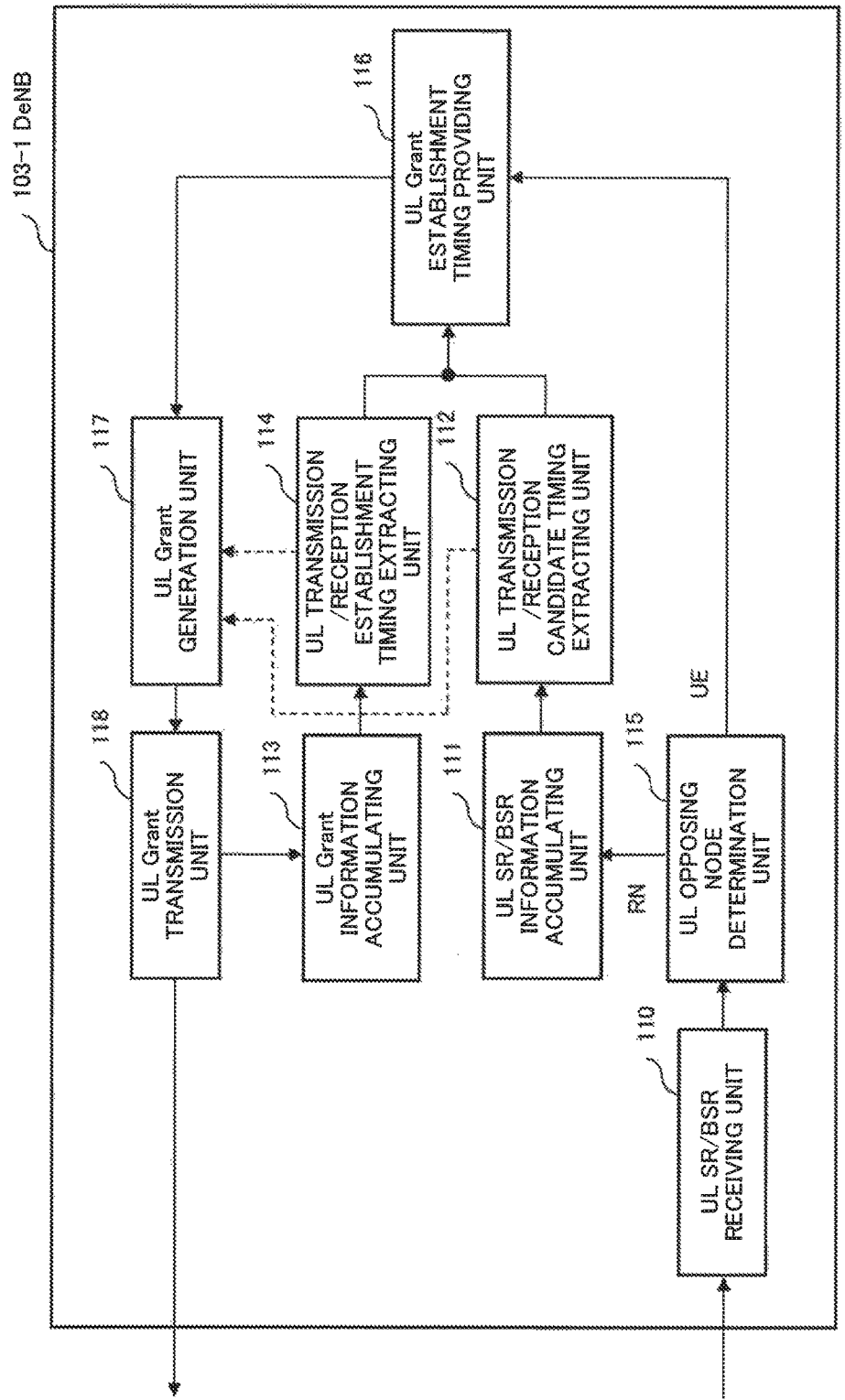
FIG. 9 is a diagram illustrating an example of an internal structure of a DeNB illustrated in FIG. 7.

FIG. 9 is a diagram illustrating an example of an internal structure of the DeNB 103-1 illustrated in FIG. 7. The DeNB 103-1 illustrated in FIG. 7 includes, as illustrated in FIG. 9, a UL SR/BSR receiving unit 110, a UL SR/BSR information accumulating unit 111, a UL transmission/reception candidate timing extracting unit 112, a UL Grant information accumulating unit 113, a UL transmission/reception establishment timing extracting unit 114, a UL opposing node determination unit 115, a UL Grant establishment timing providing unit 116, a UL Grant generation unit 117, and a UL Grant transmission unit 118. Note that FIG. 9 illustrates only structure elements concerning this example embodiment, of the structure elements that the DeNB 103-1 illustrated in FIG. 7 includes. Furthermore, the DeNB 103-2 illustrated in FIG. 7 also includes the structure elements illustrated in FIG. 9.

The UL SR/BSR receiving unit 110 receives the UL SR and the UL BSR sent from the RN 203 and outputs the UL SR and the UL BSR to the UL opposing node determination unit 115.

The UL SR/BSR information accumulating unit 111 accumulates a send feasible timing candidate for the UL BSR and reception feasible timing candidate information regarding the UL Grant that are contained in the UL SR that the UL SR/BSR receiving unit 110 has output. Furthermore, the UL SR/BSR information accumulating unit 111 accumulates a send feasible timing candidate for the UL Data and reception feasible timing candidate information regarding the UL Grant that are contained in the UL BSR that the UL SR/BSR receiving unit 110 has output.

The UL transmission/reception candidate timing extracting unit 112 extracts the send feasible timing candidate for the UL BSR and the reception feasible timing candidate information regarding the UL Grant that are accumulated in the UL SR/BSR information accumulating unit 111. Furthermore, the UL transmission/reception candidate timing extracting unit 112 extracts the send feasible timing candidate for the UL Data and the reception feasible timing candidate information regarding the UL Grant that are accumulated in the UL SR/BSR information accumulating unit 111.

The UL Grant information accumulating unit 113 accumulates the send timing of the UL BSR/UL Data and the reception timing information regarding the UL Grant that have already been sent from the UL Grant transmission unit 118.

The UL transmission/reception establishment timing extracting unit 114 extracts the send timing of the UL BSR/UL Data and the reception timing information regarding the UL Grant that are accumulated in the UL Grant information accumulating unit 113.

The UL opposing node determination unit 115 performs determination regarding an opposing node. Concretely, the UL opposing node determination unit 115 determines whether the opposing node connected to a lower order is the UE 300-1, 300-2 or the RN 203. In this example embodiment, because the structure elements illustrated in FIG. 9 are packaged in the DeNB 103-1, the UL opposing node determination unit 115 determines that the opposing node is the RN 203. On the other hand, in the case where the structure elements illustrated in FIG. 9 are packaged in the RN 203, the UL opposing node determination unit 115 determines that the opposing node is the UE 300-1 or 300-2.

It is assumed here that the UL opposing node determination unit 115 has determined that the opposing node is the UE 300-1 or 300-2. In this case, the UL Grant establishment timing providing unit 116 provides timings other than the timings extracted by the UL transmission/reception establishment timing extracting unit 114 as a reception timing of the UL Grant and a send timing of the UL BSR/UL Data.

Furthermore, it is assumed that the UL opposing node determination unit 115 has determined that the opposing node is the RN 203. In this case, the UL Grant establishment timing providing unit 116 provides the timings extracted by the UL transmission/reception establishment timing extracting unit 114 and the UL transmission/reception candidate timing extracting unit 112 as a reception timing of the UL Grant and a send timing of the UL BSR/UL Data.

The UL Grant generation unit 117, based on the information provided by the UL Grant establishment timing providing unit 116, generates a UL Grant and outputs the UL Grant to the UL Grant transmission unit 118.

The UL Grant transmission unit 118 sends to the RN 203 the UL Grant that the UL Grant generation unit 117 has output.

Hereinafter, a communication method in the communication system illustrated in FIG. 7 will be described. Here, the communication method will be described with reference to an example case where communication between the DeNB 103-1 and the UE 300-1 is relayed by the RN 203.

First, the transmission processing of the UL SR/UL BSR in the RN 203 illustrated in FIG. 7 will be described.

Figure 10:
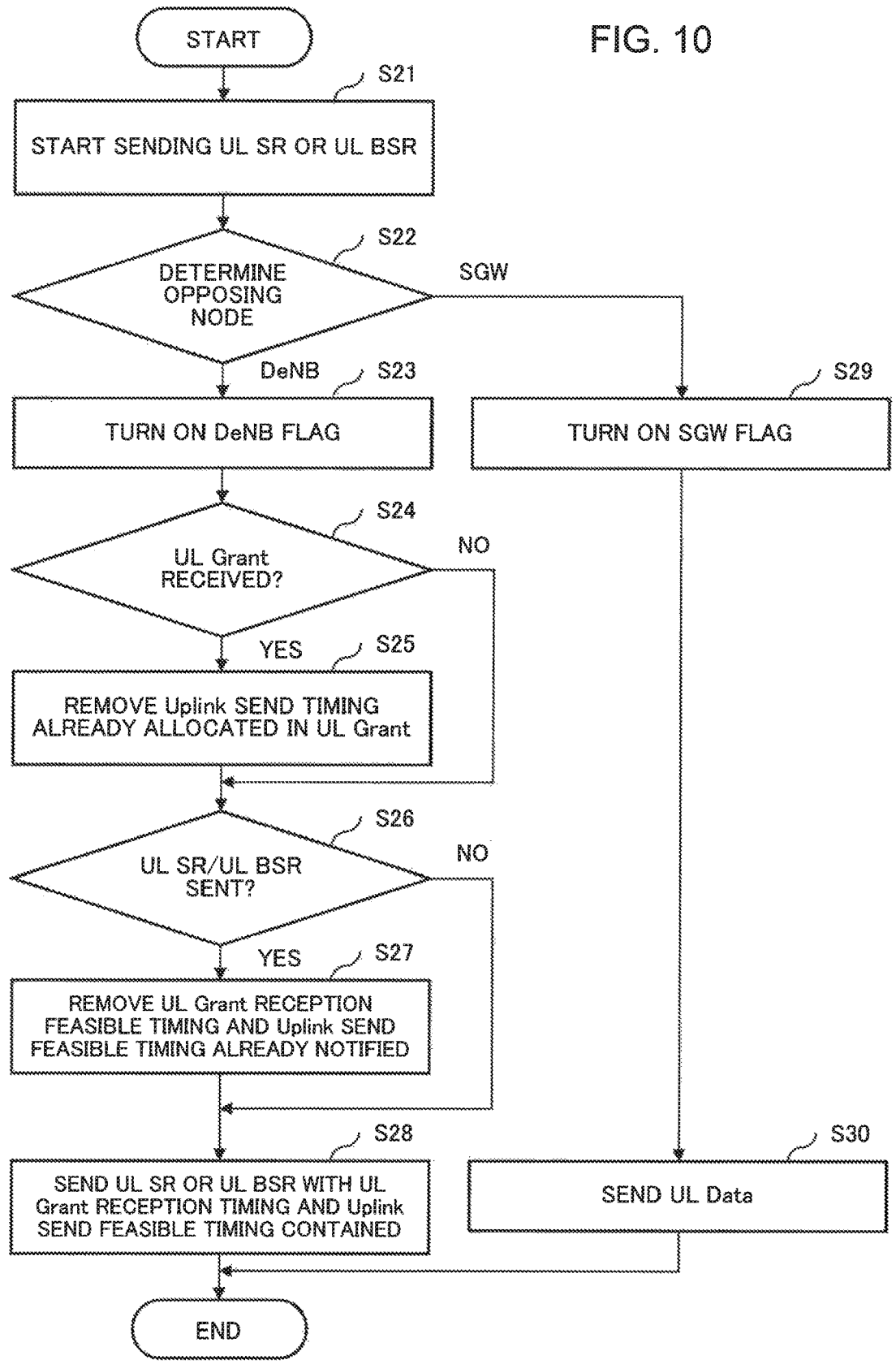
FIG. 10 is a flowchart for describing an example of transmission processing of a UL SR/UL BSR in the RN illustrated in FIG. 7, in a communication method in the communication system illustrated in FIG. 7.

FIG. 10 is a flowchart for describing an example of the transmission processing of the UL SR/UL BSR in the RN 203 illustrated in FIG. 7, in the communication method in the communication system illustrated in FIG. 7.

First, after the RN 203 starts sending the UL SR or the UL BSR (step S21), the UL opposing node determination unit 216 determines whether the opposing node is the DeNB 103-1 or a higher-order apparatus, such as SGW (step S22). When the UL opposing node determination unit 216 determines that the opposing node is the DeNB 103-1, the UL opposing node flag providing unit 217 provides a DeNB flag (step S23).

Then, the UL transmission establishment timing extracting unit 214 determines whether the UL Grant receiving unit 210 has received the UL Grant, that is, whether the UL Grant information accumulating unit 212 has accumulated UL Grant (step S24). When the UL Grant information accumulating unit 212 has accumulated the UL Grant, the UL transmission establishment timing extracting unit 214 removes the send timing of the Uplink that has already been allocated by the accumulated UL Grant (step S25).

On the other hand, when in the step S24, the UL Grant information accumulating unit 212 has not accumulated the UL Grant, the processing in step S25 is not performed.

Subsequently, the UL SR/BSR information accumulating unit 213 determines whether the UL SR transmission unit 223 has already sent the UL SR or whether the UL BSR transmission unit 221 has already sent the UL BSR (step S26). This determination utilizes the determination carried out by the UL SR/BSR information accumulating unit 213 as to whether the UL SR/BSR information accumulating unit 213 has accumulated the send timing information on the UL BSR and the reception timing information on the UL Grant, or, the send timing information on the UL Data and the reception timing information on the UL Grant.

For example, when the UL SR/BSR information accumulating unit 213 has accumulated the send timing information on the UL BSR and the reception timing information on the UL Grant, the UL SR/BSR information accumulating unit 213 determines that the UL SR transmission unit 223 has already sent the UL SR. Furthermore, for example, when the UL SR/BSR information accumulating unit 213 has accumulated the send timing information on the UL Data and the reception timing information on the UL Grant, the UL SR/BSR information accumulating unit 213 determines that the UL BSR transmission unit 221 has already sent the UL BSR.

When the UL SR/BSR information accumulating unit 213 has determined that the UL SR transmission unit 223 has already sent the UL SR, the UL transmission/reception candidate timing extracting unit 215, using the UL SR, removes the UL Grant reception feasible timing and the Uplink send feasible timing that have been already notified. Furthermore, when the UL SR/BSR information accumulating unit 213 has determined that the UL BSR transmission unit 221 has already sent the UL BSR, the UL transmission/reception candidate timing extracting unit 215, using the UL BSR, removes the UL Grant reception feasible timing and the Uplink send feasible timing that have been already notified (step S27).

On the other hand, when, in step S26, the UL SR/BSR information accumulating unit 213 has determined that the UL SR transmission unit 223 has not already sent the UL SR or the UL BSR transmission unit 221 has not already sent the UL BSR, the processing in step S27 is not performed.

Subsequently, when the signal to be sent is the UL SR, the UL transmission/reception feasible timing candidate providing unit 218, based on a result of the foregoing timing removal, provides a reception feasible timing candidate for the UL Grant and a send feasible timing candidate for the UL BSR that are to be contained in the UL SR. Then, the UL SR in which the provided timing information is contained is generated by the UL SR generating unit 222 and is sent to the DeNB 103-1 by the UL SR transmission unit 223. Furthermore, when the signal to be sent is the UL BSR, the UL transmission/reception feasible timing candidate providing unit 218, based on a result of the foregoing timing removal, provides a send feasible timing candidate for the UL Data and a reception feasible timing candidate for the UL Grant. Then, the UL BSR in which the provided timing information is contained is generated by the UL BSR generating unit 220 and sent to the DeNB 103-1 by the UL BSR transmission unit 221 (step S28).

On the other hand, in the case where the transmission unit 204 is packaged in the DeNB 103-1, the UL opposing node determination unit 216 determines in step S22 that the opposing node is an SGW, so that the UL opposing node flag providing unit 217 provides an SGW flag (step S29). Then, the DeNB 103-1 sends the UL Data to the SGW (step S30).

Next, the transmission processing of the UL Grant in the DeNB 103-1 illustrated in FIG. 7 will be described.

Figure 11:
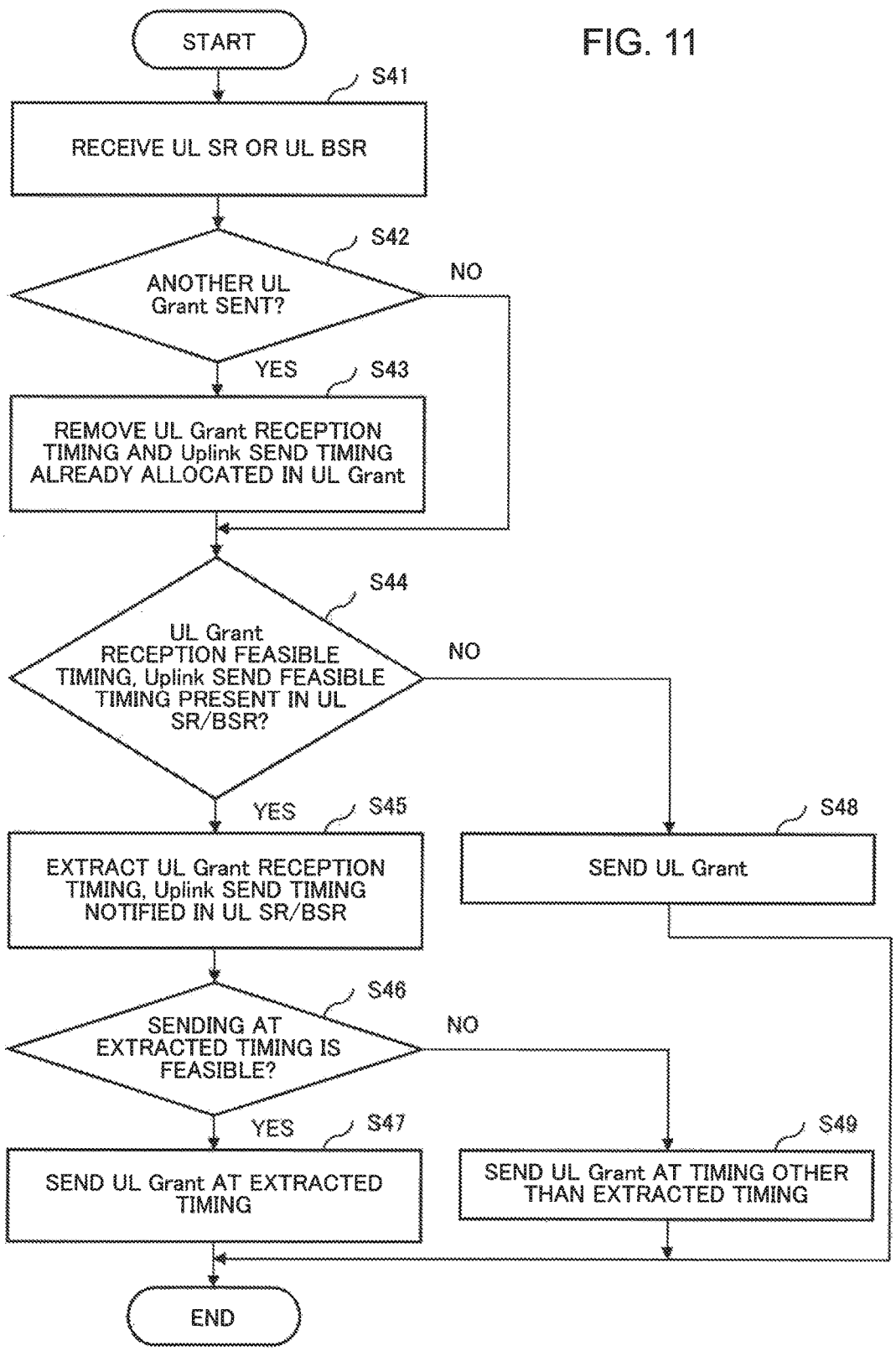
FIG. 11 is a flowchart for describing an example of transmission processing of a UL Grant in a DeNB illustrated in FIG. 7, in the communication method in the communication system illustrated in FIG. 7.

FIG. 11 is a flowchart for describing an example of the transmission processing of the UL Grant in the DeNB 103-1 illustrated in FIG. 7, in the communication method in the communication system illustrated in FIG. 7.

First, when the UL SR/BSR receiving unit 110 receives the UL SR or the UL BSR (step S41), it is determined whether the UL Grant transmission unit 118 has sent another UL Grant (step S42). For example, it may be determined whether the UL Grant transmission unit 118 has sent another UL Grant, based on whether the UL Grant information accumulating unit 113 has accumulated the reception timing information on the UL Grant already sent from the UL Grant transmission unit 118. Concretely, when the UL Grant information accumulating unit 113 has accumulated the reception timing information on the UL Grant already sent from the UL Grant transmission unit 118, it may be determined that the UL Grant transmission unit 118 has sent another UL Grant.

When it is determined that the UL Grant transmission unit 118 has sent another UL Grant, the UL transmission/reception establishment timing extracting unit 114 removes the send timing of the Uplink and the reception timing of the UL Grant already allocated in the UL Grant accumulated in the UL Grant information accumulating unit 113 (step S43).

On the other hand, when, in step S42, the UL Grant information accumulating unit 113 has not accumulated the UL Grant, the processing in step S43 is not performed.

Subsequently, the UL SR/BSR information accumulating unit 111 determines whether the UL SR/UL BSR received by the UL SR/BSR receiving unit 110 contains the UL Grant reception feasible timing and the Uplink send feasible timing (step S44). When the UL SR/UL BSR received by the UL SR/BSR receiving unit 110 contains the UL Grant reception feasible timing and the Uplink send feasible timing, the UL SR/BSR information accumulating unit 111 accumulates these timings. Then, the UL transmission/reception candidate timing extracting unit 112 extracts the UL Grant reception feasible timing and the Uplink send feasible timing accumulated in the UL SR/BSR information accumulating unit 111 (step S45).

Subsequently, the UL Grant establishment timing providing unit 116 determines whether the UL Grant can be sent at the timings extracted by the UL transmission/reception establishment timing extracting unit 114 and the UL transmission/reception candidate timing extracting unit 112 (step S46). When the UL Grant establishment timing providing unit 116 has determined that the UL Grant can be sent at the extracted timings, the UL Grant establishment timing providing unit 116 provides the timings as the reception timing of the UL Grant and the send timing of the UL BSR/UL Data. Then, the UL Grant generation unit 117 generates the UL Grant, based on information provided by the UL Grant establishment timing providing unit 116. Subsequently, the UL Grant transmission unit 118 sends the UL Grant generated by the UL Grant generation unit 117 to the RN 203 (step S47).

On the other hand, when, in step S44, the UL SR/UL BSR received by the UL SR/BSR receiving unit 110 does not contain the UL Grant reception feasible timing and the Uplink send feasible timing, the UL Grant generation unit 117 generates a UL Grant. Subsequently, the UL Grant transmission unit 118 sends the UL Grant generated by the UL Grant generation unit 117 to the RN 203 (step S48).

Furthermore, it is assumed that, in step S46, the UL Grant establishment timing providing unit 116 determines that the UL Grant cannot be sent at the extracted timings. In this case, the UL Grant establishment timing providing unit 116 provides timings other than the aforementioned timings as a reception timing of the UL Grant and a send timing of the UL BSR/UL Data. Then, the UL Grant generation unit 117 generates a UL Grant based on information provided by the UL Grant establishment timing providing unit 116. Subsequently, the UL Grant transmission unit 118 sends the UL Grant generated by the UL Grant generation unit 117 to the RN 203 (step S49).

Next, transmission processing of the UL Data in the RN 203 illustrated in FIG. 7 will be described.

Figure 12:
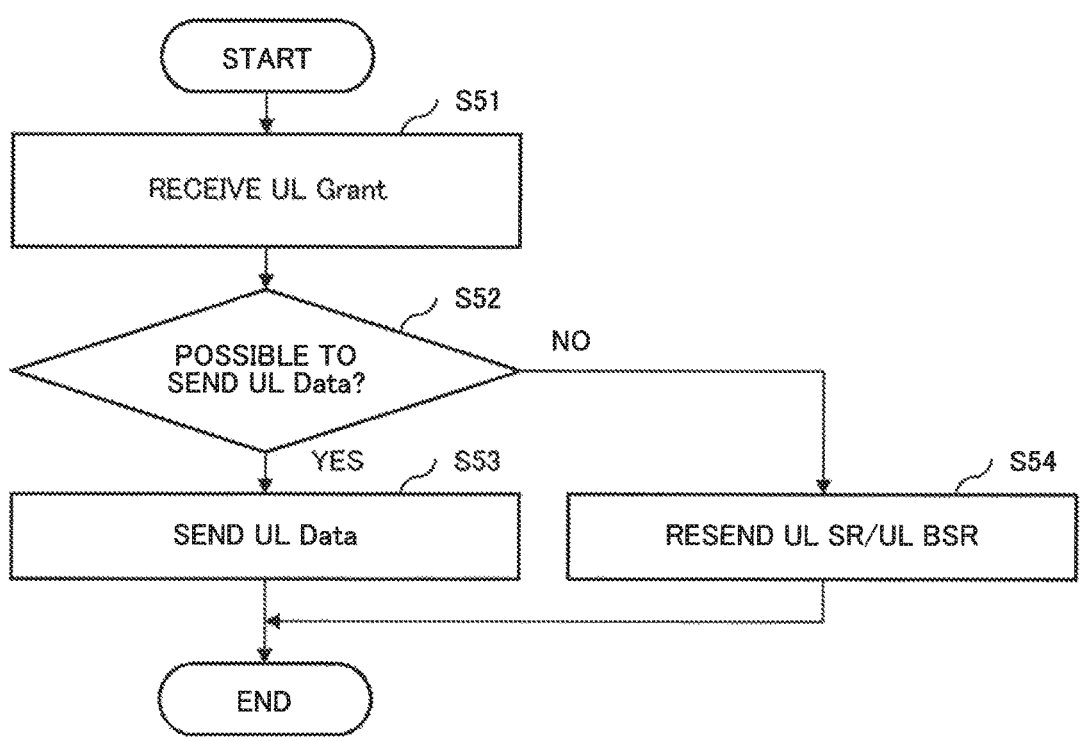
FIG. 12 is a flowchart for describing an example of transmission processing of a UL Data in the RN illustrated in FIG. 7, in the communication method in the communication system illustrated in FIG. 7.

FIG. 12 is a flowchart for describing an example of the transmission processing of the UL Data in the RN 203 illustrated in FIG. 7, in the communication method in the communication system illustrated in FIG. 7.

First, when the UL Grant receiving unit 210 receives a UL Grant sent from the DeNB 103-1 (step S51), the UL Grant information accumulating unit 212 accumulates timing information contained in the received UL Grant. Subsequently, the UL Data transmission feasibility determination unit 224 determines whether the UL Data can be sent, based on the timing information accumulated in the UL Grant information accumulating unit 212 (step S52). For example, the UL Data transmission feasibility determination unit 224 determines that the UL Data cannot be sent, when the timing information accumulated in the UL Grant information accumulating unit 212 is used for sending to another DeNB. When the UL Data transmission feasibility determination unit 224 has determined that the UL Data can be sent at the timing received by the UL Grant receiving unit 210, the UL Data transmission unit 226 sends the UL Data to the DeNB 103-1 at that timing (step S53).

On the other hand, when, in step S52, the UL Data transmission feasibility determination unit 224 determines that the UL Data cannot be sent at the timing received by the UL Grant receiving unit 210, the SR/BSR retransmission processing unit 225 performs the retransmission processing of the UL SR/BSR (step S54).

Figure 13:
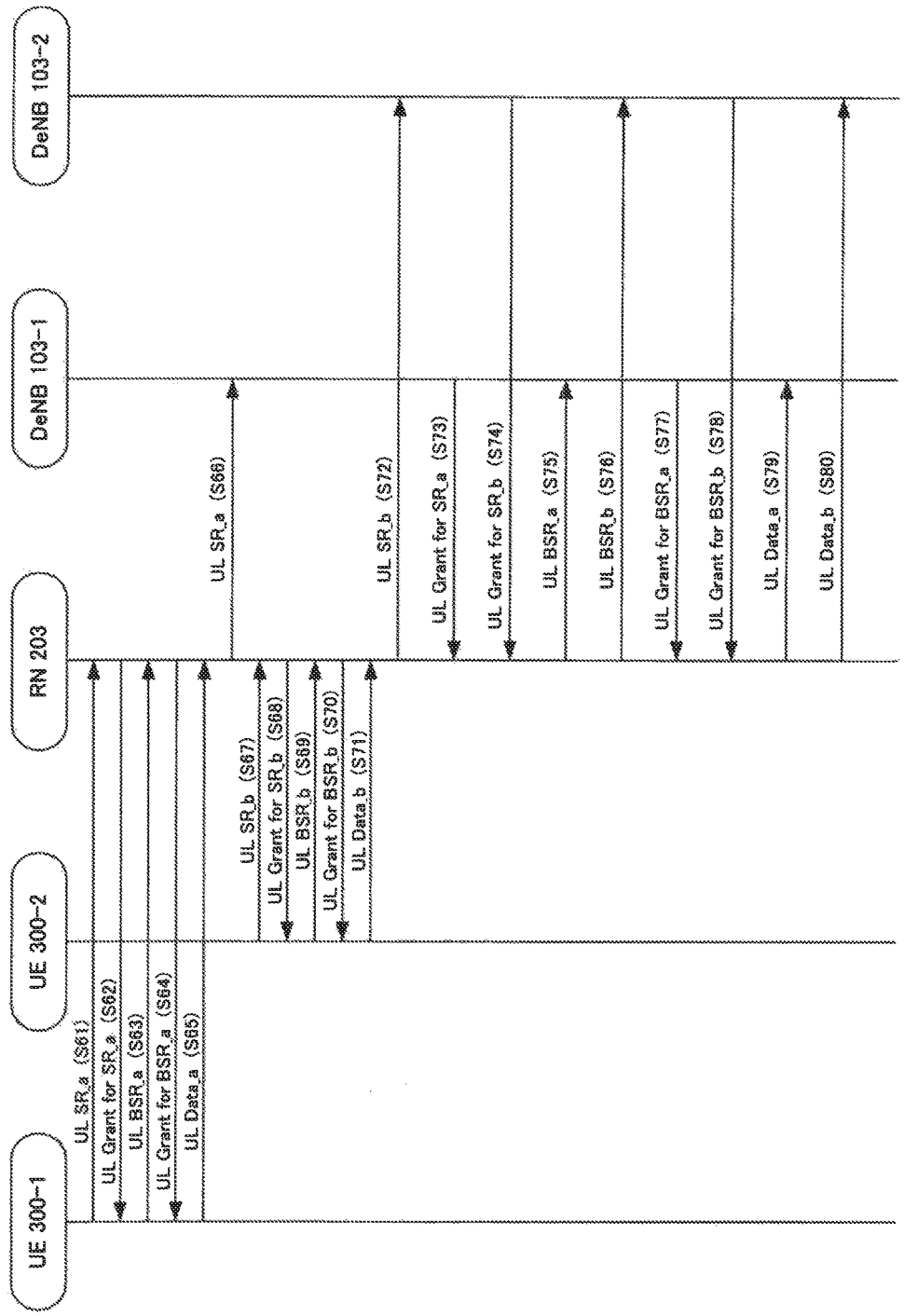
FIG. 13 is a sequence chart for describing an example of flow of data in the communication system illustrated in FIG. 7.

Hereinafter, flow of data among the UEs 300-1 and 300-2, the RN 203, and the DeNBs 103-1 and 103-2 based on the foregoing processing will be described. FIG. 13 is a sequence chart for describing an example of the flow of data in the communication system illustrated in FIG. 7.

First, the UE 300-1 sends to the RN 203 an uplink scheduling request signal (UL SR_a) for sending to the DeNB 103-1 UL Data that are uplink data (step S61). Then, the RN 203 sends the response signal (UL Grant for SR_a) to the UE 300-1 (step S62). Subsequently, the UE 300-1 sends to the RN 203 an uplink buffer status-reporting signal (UL BSR_a) that indicates the storage status of a buffer that temporarily stores the UL Data (step S63). Then, the RN 203 sends the response signal (UL Grant for BSR_a) to the UE 300-1 (step S64). The UE 300-1, receiving the UL Grant for BSR_a, sends to the RN 203 the uplink data (UL Data_a) that is to be sent to the DeNB 103-1 (step S65).

The RN 203, after receiving the UL Data_a from the UE 300-1, sends the UL SR_a to the DeNB 103-1 (step S66). At this time, the RN 203 sends the UL SR_a in which a timing at which a UL Grant for SR_a that is a response signal to the UL SR_a can be received and a timing at which a UL BSR_a can be sent are contained.

Furthermore, the UE 300-2 sends to the RN 203 an uplink scheduling request signal (UL SR_b) for sending to the DeNB 103-2 UL Data that are uplink data (step S67). Then, the RN 203 sends a response signal (UL Grant for SR_b) to the UE 300-2 (step S68). Subsequently, the UE 300-2 sends to the RN 203 an uplink buffer status-reporting signal (UL BSR_b) that indicates the storage status of a buffer that temporarily stores the UL Data (step S69). Then, the RN 203 sends a response signal (UL Grant for BSR_b) to the UE 300-2 (step S70). Receiving the UL Grant for BSR_b, the UE 300-2 sends to the RN 203 uplink data (UL Data_b) that are to be sent to the DeNB 103-2 (step S71).

The RN 203, after receiving the UL Data_b from the UE 300-2, sends the UL SR_b to the DeNB 103-2 (step S72). At this time, the RN 203 sends the UL SR_b in which a timing at which a UL Grant for SR_b that is a response signal to the UL SR_b can be received and a timing at which a UL BSR_b can be sent are contained.

Note that the timing at which the UL Grant for SR_a can be received and which is sent in step S66 and the timing at which the UL Grant for SR_b can be received and which is sent in step S72 are timings such that the reception processing of one of the signals does not affect the reception processing of the other signal. This is just as stated above.

Furthermore, the timing at which the UL BSR_a can be sent and which is contained in the UL SR_a in step S66 and the timing at which the UL BSR_b can be sent and which is contained in the UL SR_b in step S72 are timings such that the transmission processing of one of the two signals does not affect the transmission processing of the other signal. This is also just as stated above.

Then, the DeNB 103-1 sends the UL Grant for SR_a to the RN 203, based on the timing at which UL Grant for SR_a can be received and which is contained in the UL SR_a sent from the RN 203 (step S73). Furthermore, the DeNB 103-2 sends the UL Grant for SR_b to the RN 203, based on the timing at which the UL Grant for SR_b can be received and which is contained in the UL SR_b sent from the RN 203 (step S74).

Subsequently, the RN 203 sends the UL BSR_a to the DeNB 103-1 at the timing notified to the DeNB 103-1 in step S66 (step S75). At this time, the RN 203 sends the UL BSR_a in which a timing at which the UL Grant for BSR_a, which is a response signal to the UL BSR_a, can be received and a timing at which the UL Data_a can be sent are contained. Furthermore, the RN 203 sends the UL BSR_b to the DeNB 103-2 at the timing notified to the DeNB 103-2 in step S72 (step S76). At this time, the RN 203 sends the UL BSR_b in which a timing at which the UL Grant for BSR_b, which is a response signal to the UL BSR_b, can be received and a timing at which the UL Data_b can be sent are contained.

Note that the timing at which the UL Grant for BSR_a can be received and which is contained in the UL BSR_a in step S75 and the timing at which the UL Grant for BSR_b can be received and which is contained in the UL BSR_b in step S76 are timings such that the reception processing of one of the two signals does not affect the reception processing of the other signal. This is just as stated above. Furthermore, the timing at which the UL Data_a can be sent and which is contained in the UL BSR_a in step S75 and the timing at which the UL Data_b can be sent and which is contained in the UL BSR_b in step S76 are timings such that the transmission processing of one of the two signals does not affect the transmission processing of the other signal. This is also just as stated above.

Then, the DeNB 103-1 sends the UL Grant for BSR_a to the RN 203, based on the timing at which the UL Grant for BSR_a can be received and which is contained in the UL BSR_a sent from the RN 203 (step S77). Furthermore, the DeNB 103-2 sends the UL Grant for BSR_b to the RN 203, based on the timing at which the UL Grant for BSR_b can be received and which is contained in the UL BSR_b sent from the RN 203 (step S78).

Subsequently, the RN 203 sends the UL Data_a to the DeNB 103-1 at the timing notified to the DeNB 103-1 in step S75 (step S79). Furthermore, the RN 203 sends the UL Data_b to the DeNB 103-2 at the timing notified to the DeNB 103-2 in step S76 (step S80).

Thus, the RN 203 notifies the DeNBs 103-1 and 103-2 of the timing at which the RN 203 can receive the response signal and the timing at which the RN 203 can send uplink data and then, at these timings, sends the request signal and the uplink data to the DeNBs 103-1 and 103-2. Therefore, the communication system of the third example embodiment can prevent failure in the reception processing of the response signal and failure in the transmission processing of uplink data and therefore can made data transmission more efficient.

Fourth Example Embodiment

Figure 14:
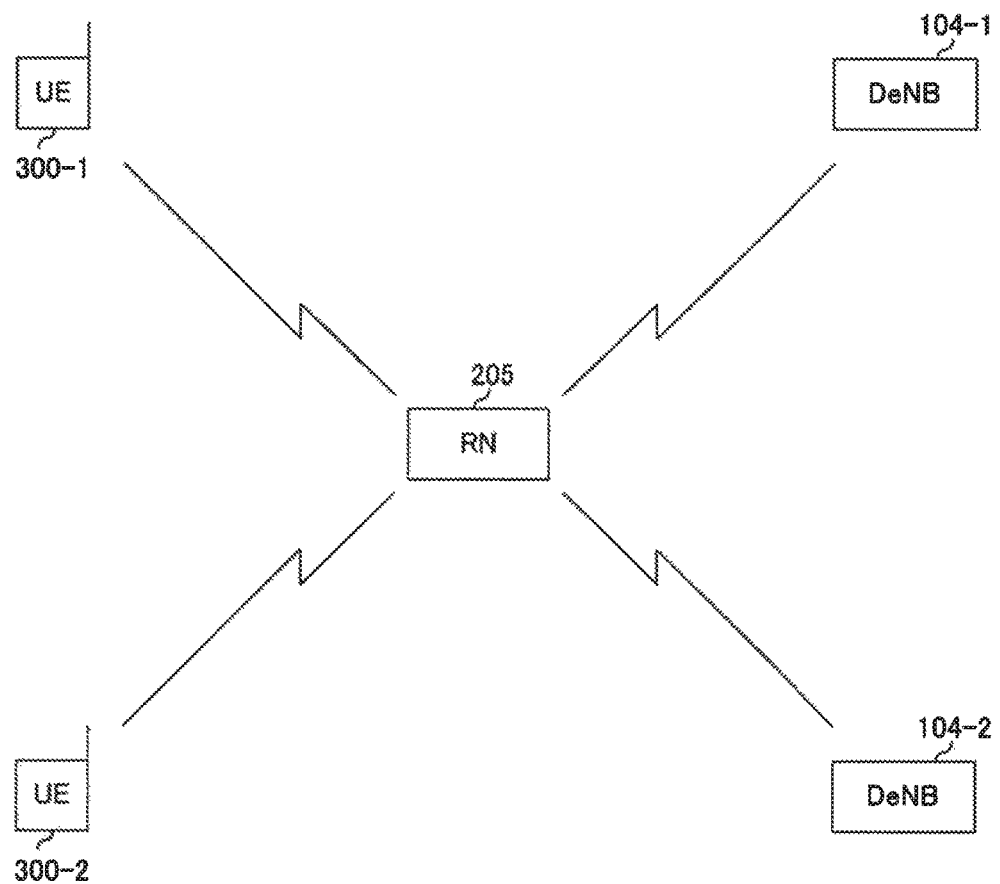
FIG. 14 is a diagram illustrating a fourth example embodiment of the communication system of the present invention.

FIG. 14 is a diagram illustrating a fourth example embodiment of the communication system of the present invention.

The communication system in this example embodiment includes DeNBs 104-1 and 104-2, an RN 205, and UEs 300-1 and 300-2 as illustrated in FIG. 14.

The DeNB 104-1 is a radio base station that communicates with the UE 300-1 via the RN 205. The DeNB 104-2 is a radio base station that communicates with the UE 300-2 via the RN 205. The DeNBs 104-1 and 104-2 send downlink signals to the RN 205, using an orthogonal frequency-division multiplexing access method.

The RN 205 is a radio relay station that relays communication between the DeNB 104-1 and the UE 300-1 and communication between the DeNB 104-2 and the UE 300-2.

The UE 300-1 is a communication terminal that communicates with the DeNB 104-1 via the RN 205. The UE 300-2 is a communication terminal that communicates with the DeNB 104-2 via the RN 205.

Figure 15:
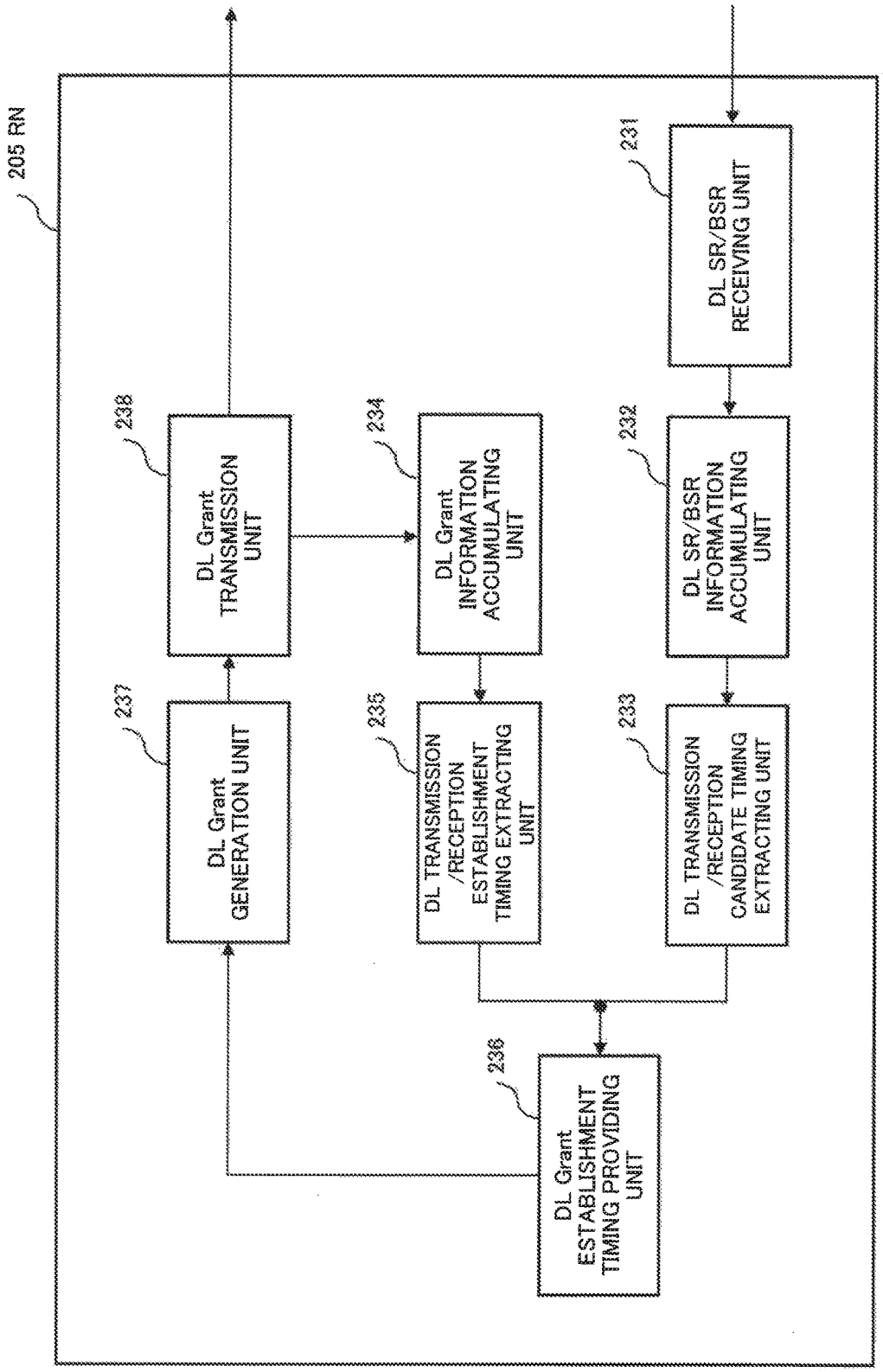
FIG. 15 is a diagram illustrating an example of an internal structure of an RN illustrated in FIG. 14.

FIG. 15 is a diagram illustrating an example of an internal structure of the RN 205 illustrated in FIG. 14.

The RN 205 illustrated in FIG. 14 includes, as illustrated in FIG. 15, a DL SR/BSR receiving unit 231, a DL SR/BSR information accumulating unit 232, a DL transmission/reception candidate timing extracting unit 233, a DL Grant information accumulating unit 234, a DL transmission/reception establishment timing extracting unit 235, a DL Grant establishment timing providing unit 236, a DL Grant generation unit 237, and a DL Grant transmission unit 238. Note that FIG. 15 illustrates only structure elements concerning this example embodiment, of the structure elements that the RN 205 illustrated in FIG. 14 include.

The DL SR/BSR receiving unit 231 receives a downlink buffer status report (DL Buffer Status Report, referred to hereinafter as DL BSR) and a downlink scheduling information (DL Scheduling Request, referred to hereinafter as DL SR) sent from the DeNBs 104-1 and 104-2. The DL SR/BSR receiving unit 231 outputs the DL SR and the DL BSR received to the DL SR/BSR information accumulating unit 232.

The DL SR/BSR information accumulating unit 232 accumulates a send feasible timing candidate for the DL BSR and reception feasible timing candidate information on a DL Grant that is a response signal to the DL SR which are contained in the DL SR output by the DL SR/BSR receiving unit 231. The DL SR/BSR information accumulating unit 232 accumulates a send feasible timing candidate for downlink data (DL Data) and reception feasible timing candidate information on the DL Grant that is a response signal to the DL BSR which are contained in the DL BSR output by the DL SR/BSR receiving unit 231.

The DL transmission/reception candidate timing extracting unit 233 extracts from the DL SR/BSR information accumulating unit 232 the send feasible timing candidate for the DL BSR and the reception feasible timing candidate information for the DL Grant that is a response signal to the DL SR. Furthermore, the DL transmission/reception candidate timing extracting unit 233 extracts from the DL SR/BSR information accumulating unit 232 the send feasible timing candidate for the DL Data and the reception feasible timing candidate information on the DL Grant that is a response signal to the DL BSR.

The DL Grant information accumulating unit 234 accumulates the send timing of the DL BSR/DL Data and the reception timing information on the DL Grant that the DL Grant transmission unit 238 sends.

The DL transmission/reception establishment timing extracting unit 235 extracts the send timing of the DL SR/BSR and the reception timing information on the DL Grant from the DL Grant information accumulating unit 234.

The DL Grant establishment timing providing unit 236 provides the reception timing of the DL Grant and the send timing of the DL BSR/DL Data, based on the timings extracted by the DL transmission/reception establishment timing extracting unit 235 and the DL transmission/reception candidate timing extracting unit 233.

The DL Grant generation unit 237 generates the DL Grant based on the timing provided by the DL Grant establishment timing providing unit 236.

The DL Grant transmission unit 238 sends the DL Grant generated by the DL Grant generation unit 237 to the DeNBs 104-1 and 104-2.

Figure 16:
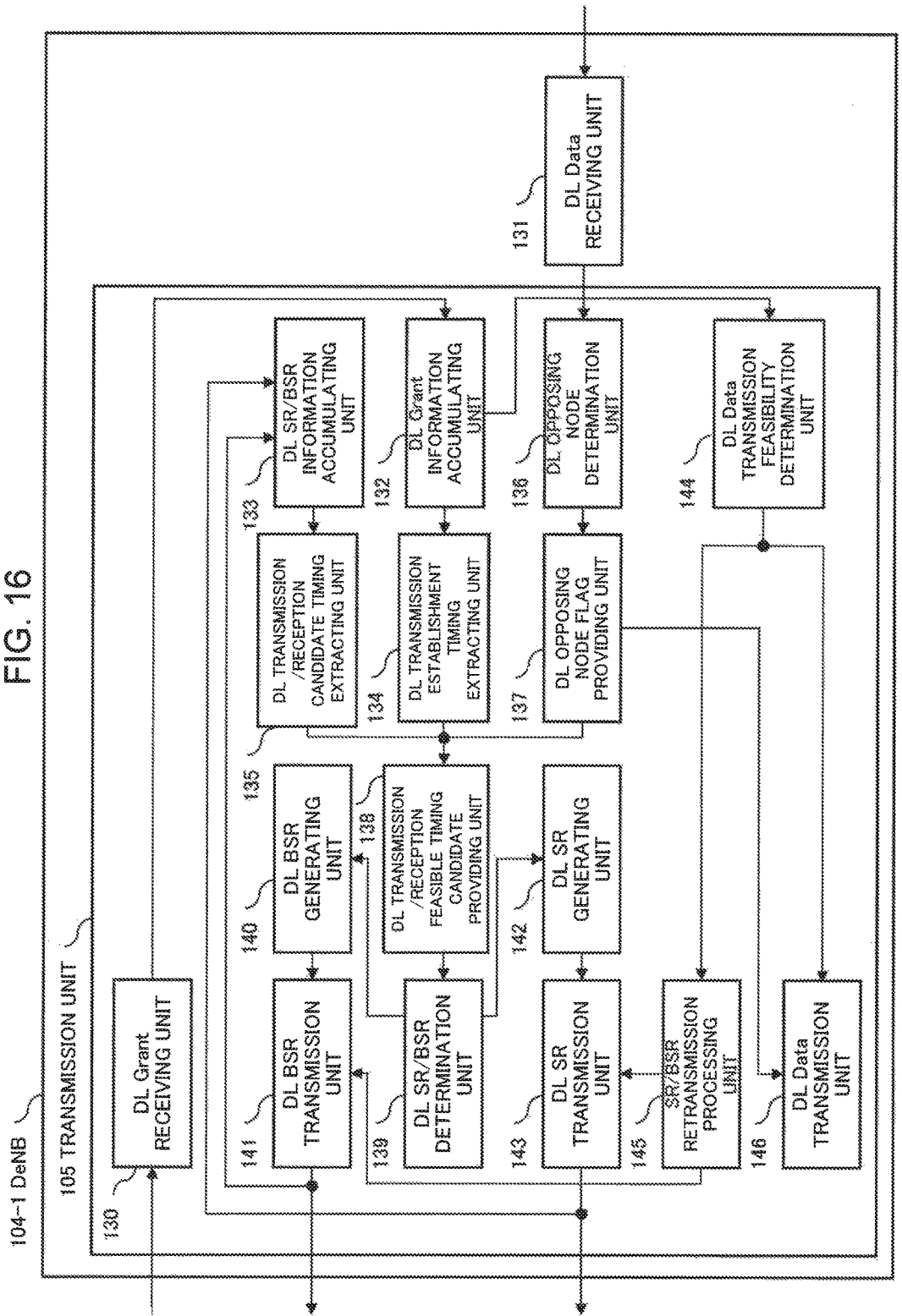
FIG. 16 is a diagram illustrating an example of an internal structure of a DeNB illustrated in FIG. 14.

FIG. 16 is a diagram illustrating an example of an internal structure of the DeNB 104-1 illustrated in FIG. 14.

The DeNB 104-1 illustrated in FIG. 14 includes a transmission unit 105 and a DL Data receiving unit 131 as illustrated in FIG. 16. Furthermore, the transmission unit 105 includes a DL Grant receiving unit 130, a DL Grant information accumulating unit 132, a DL SR/BSR information accumulating unit 133, a DL transmission establishment timing extracting unit 134, a DL transmission/reception candidate timing extracting unit 135, a DL opposing node determination unit 136, a DL opposing node flag providing unit 137, a DL transmission/reception feasible timing candidate providing unit 138, a DL SR/BSR determination unit 139, a DL BSR generating unit 140, a DL BSR transmission unit 141, a DL SR generating unit 142, a DL SR transmission unit 143, a DL Data transmission feasibility determination unit 144, an SR/BSR retransmission processing unit 145, and a DL Data transmission unit 146. Note that FIG. 16 illustrates only structure elements concerning this example embodiment, of the structure element that the DeNB 104-1 illustrated in FIG. 14 includes. Furthermore, the DeNB 104-2 illustrated in FIG. 14 also include the structure elements illustrated in FIG. 16.

The DL Data receiving unit 131 receives downlink data (DL Data) sent from a higher-order apparatus such as an SGW. The DL Data receiving unit 131 outputs the received DL Data to the DL opposing node determination unit 136.

The DL Grant receiving unit 130 receives the DL Grant sent from the RN 205. The DL Grant receiving unit 130 outputs the received DL Grant to the DL Grant information accumulating unit 132.

The DL Grant information accumulating unit 132 accumulates the DL Grant output by the DL Grant receiving unit 130.

The DL SR/BSR information accumulating unit 133 accumulates send timing information on the DL BSR and reception timing information on the DL Grant that are contained in a DL SR already sent by the DL SR transmission unit 143. Furthermore, the DL SR/BSR information accumulating unit 133 accumulates send timing information on the DL Data and reception timing information on the DL Grant that are contained in a DL BSR already sent from the DL BSR transmission unit 141.

The DL transmission establishment timing extracting unit 134 extracts a send timing candidate for the DL BSR that is to be contained in the DL SR, by using the DL Grant accumulated in the DL Grant information accumulating unit 132. Furthermore, the DL transmission establishment timing extracting unit 134 extracts a send feasible timing candidate for the DL Data that are to be contained in the DL BSR, by using the DL Grant accumulated in the DL Grant information accumulating unit 132.

The DL transmission/reception candidate timing extracting unit 135 refers to the send timing candidate for the DL BSR and the reception timing for the DL Grant that are contained in the DL SR accumulated in the DL SR/BSR information accumulating unit 133. Furthermore, the DL transmission/reception candidate timing extracting unit 135 refers to the send timing candidate for the DL Data and the reception timing of the DL Grant that are contained in the DL BSR accumulated in the DL SR/BSR information accumulating unit 133. Then, the DL transmission/reception candidate timing extracting unit 135 extracts, from these timings referred to, the send timing candidates for the next DL BSR/DL Data that can be sent in the DL SR/BSR and the reception timing candidate for receiving the DL Grant for sending the DL BSR/DL Data.

The DL opposing node determination unit 136 determines an opposing node. Concretely, the DL opposing node determination unit 136 determines whether the opposing node is the RN 205 or the UE 300-1 or 300-2. In this example embodiment, because the transmission unit 105 is packaged in the DeNB 104-1, the DL opposing node determination unit 136 determines that the opposing node is the RN 205. On the other hand, in the case where the transmission unit 105 is packaged in the RN 205, the DL opposing node determination unit 136 determines that the opposing node is the UE 300-1 or 300-2.

The DL opposing node flag providing unit 137 provides a flag according to a result of the determination performed by the DL opposing node determination unit 136.

The DL transmission/reception feasible timing candidate providing unit 138 provides a send feasible timing candidate for the DL BSR and a reception feasible timing candidate for the DL Grant that are to be contained in the DL SR. These are accomplished based on the information extracted by the DL transmission/reception candidate timing extracting unit 135 and the DL transmission establishment timing extracting unit 134.

Furthermore, the DL transmission/reception feasible timing candidate providing unit 138 provides a send feasible timing candidate for the DL Data and a reception feasible timing candidate for the DL Grant that are to be contained in the DL BSR. These are accomplished based on the information extracted by the DL transmission/reception candidate timing extracting unit 135 and the DL transmission establishment timing extracting unit 134.

The DL SR/BSR determination unit 139 determines which one of the DL SR and the DL BSR is the next signal to be sent based on the DL Grant.

The DL BSR generating unit 140 generates the DL BSR in which the foregoing timing information is contained, when the DL SR/BSR determination unit 139 has determined that the next signal to be sent is the DL BSR.

The DL BSR transmission unit 141 is a downlink buffer status-reporting signal transmission unit that sends the DL BSR generated by the DL BSR generating unit 140 to the RN 205. In other words, the DL BSR transmission unit 141, when sending the DL BSR to the RN 205, sends the DL BSR in which information that indicates a timing at which the DL Grant for the DL BSR can be received and information that indicates a timing at which the DL Data can be sent to the RN 205 are contained.

The DL SR generating unit 142, when the DL SR/BSR determination unit 139 has determined that the next signal to be sent is the DL SR, generates the DL SR in which the foregoing timing information is contained.

The DL SR transmission unit 143 is a downlink scheduling request signal transmission unit that sends the DL SR generated by the DL SR generating unit 142 to the RN 205. In other words, the DL SR transmission unit 143, when sending the DL SR to the RN 205, sends the DL SR in which information that indicates a timing at which the DL Grant for the DL SR can be received and information that indicates a timing at which the DL BSR can be sent to the RN 205 are contained.

The DL Data transmission feasibility determination unit 144 determines whether the sending of the DL Data is feasible, based on the DL Grant accumulated in the DL Grant information accumulating unit 132. Concretely, the DL Data transmission feasibility determination unit 144 determines whether the sending of the DL Data is feasible based on the send timing notified in the DL Grant accumulated in the DL Grant information accumulating unit 132.

The SR/BSR retransmission processing unit 145 performs the retransmission processing of the DL SR and the DL BSR when the DL Data transmission feasibility determination unit 144 has determined that the DL Data cannot be sent.

When the DL Data transmission feasibility determination unit 144 has determined that the DL Data can be sent, the DL Data transmission unit 146 sends the DL Data to the RN 205.

Hereinafter, a communication method in the communication system illustrated in FIG. 14 will be described. Here, the communication method will be described with reference to an example case where the RN 205 relays communication between the DeNB 104-1 and the UE 300-1.

First, the transmission processing of the DL SR/DL BSR in the DeNB 104-1 illustrated in FIG. 14 will be described.

Figure 17:
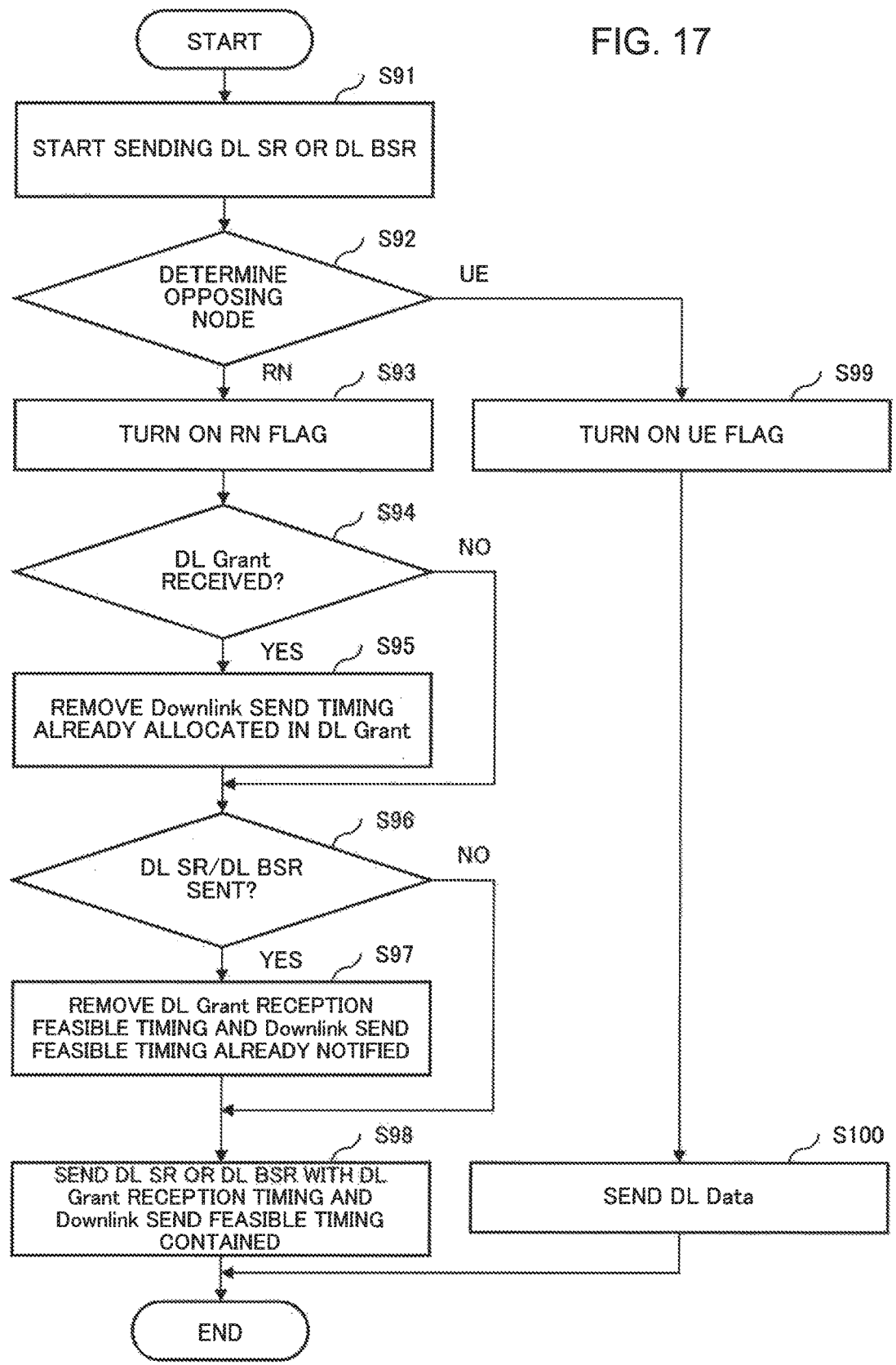
FIG. 17 is a flowchart for describing an example of transmission processing of DL SR/DL BSR in the DeNB illustrated in FIG. 14, in the communication method in the communication system illustrated in FIG. 14.

FIG. 17 is a flowchart for describing an example of the transmission processing of the DL SR/DL BSR in the DeNB 104-1 illustrated in FIG. 14, in the communication method in the communication system illustrated in FIG. 14.

First, when the DeNB 104-1 starts sending a DL SR or a DL BSR (step S91), the DL opposing node determination unit 136 determines which one of the RN 205 and the UE 300-1 is the opposing node (step S92). When the DL opposing node determination unit 136 has determined that the opposing node is the RN 205, the DL opposing node flag providing unit 137 provides an RN flag (step S93).

Then, it is determined whether the DL Grant receiving unit 130 has received the DL Grant, that is, whether the DL Grant information accumulating unit 132 has accumulated the DL Grant (step S94). When the DL Grant information accumulating unit 132 has accumulated the DL Grant, the DL transmission establishment timing extracting unit 134 removes the send timing of the Downlink already allocated in the accumulated DL Grant (step S95).

On the other hand, when, in step S94, the DL Grant information accumulating unit 132 has not accumulated the DL Grant, the processing in step S95 is not performed.

Subsequently, the DL SR/BSR information accumulating unit 133 determines whether the DL SR transmission unit 143 has already sent the DL SR or whether the DL BSR transmission unit 141 has already sent the DL BSR (step S96). This determination utilizes the determination carried out by the DL SR/BSR information accumulating unit 133 as to whether the DL SR/BSR information accumulating unit 133 has accumulated the send timing information on the DL BSR and the reception timing information on the DL Grant or the send timing information on the DL Data and the reception timing information on the DL Grant.

For example, when the DL SR/BSR information accumulating unit 133 has accumulated the send timing information on the DL BSR and the reception timing information on the DL Grant, the DL SR/BSR information accumulating unit 133 determines that the DL SR transmission unit 143 has already sent the DL SR.

Furthermore, for example, it is assumed that the DL SR/BSR information accumulating unit 133 has accumulated the send timing information on the DL Data and the reception timing information on the DL Grant. In this case, the DL SR/BSR information accumulating unit 133 determines that the DL BSR transmission unit 141 has already sent the DL BSR.

Furthermore, it is assumed that the DL SR/BSR information accumulating unit 133 has determined that the DL SR transmission unit 143 has already sent the DL SR. In this case, the DL transmission/reception candidate timing extracting unit 135 removes the DL Grant reception feasible timing and the Downlink send feasible timing that have been already notified by using the DL SR.

Furthermore, it is assumed that the DL SR/BSR information accumulating unit 133 has determined that the DL BSR transmission unit 141 has already sent the DL BSR. In this case, the DL transmission/reception candidate timing extracting unit 135 removes the DL Grant reception feasible timing and the Downlink send feasible timing that have been already notified by using the DL BSR (step S97).

On the other hand, when, in step S96, the DL SR/BSR information accumulating unit 133 determines that the DL SR transmission unit 143 has not already sent the DL SR or the DL BSR transmission unit 141 has not already sent the DL BSR, the processing in step S97 is not performed.

Subsequently, when the signal to be sent is the DL SR, the DL transmission/reception feasible timing candidate providing unit 138, based on a result of the foregoing timing removal, provides a send feasible timing candidate for the DL BSR and a reception feasible timing candidate for the DL Grant that are to be contained in the DL SR. Then, the DL SR in which the provided timing information is contained is generated by the DL SR generating unit 142 and sent to the RN 205 by the DL SR transmission unit 143. Furthermore, when the signal to be sent is the DL BSR, the DL transmission/reception feasible timing candidate providing unit 138, based on a result of the foregoing timing removal, provides a send feasible timing candidate for the DL Data and a reception feasible timing candidate for the DL Grant. Then, the DL BSR in which the provided timing information is contained is generated by the DL BSR generating unit 140 and sent to the RN 205 by the DL BSR transmission unit 141 (step S98).

On the other hand, in the case where the transmission unit 105 is packaged in the RN 205, the DL opposing node determination unit 136 determines in step S92 that the opposing node is the UE 300-1. Therefore, the DL opposing node flag providing unit 137 provides a UE flag (step S99). Then, the RN 205 sends the DL Data to the UE 300-1 (step S100).

Next, transmission processing of the DL Grant in the RN 205 illustrated in FIG. 14 will be described.

Figure 18:
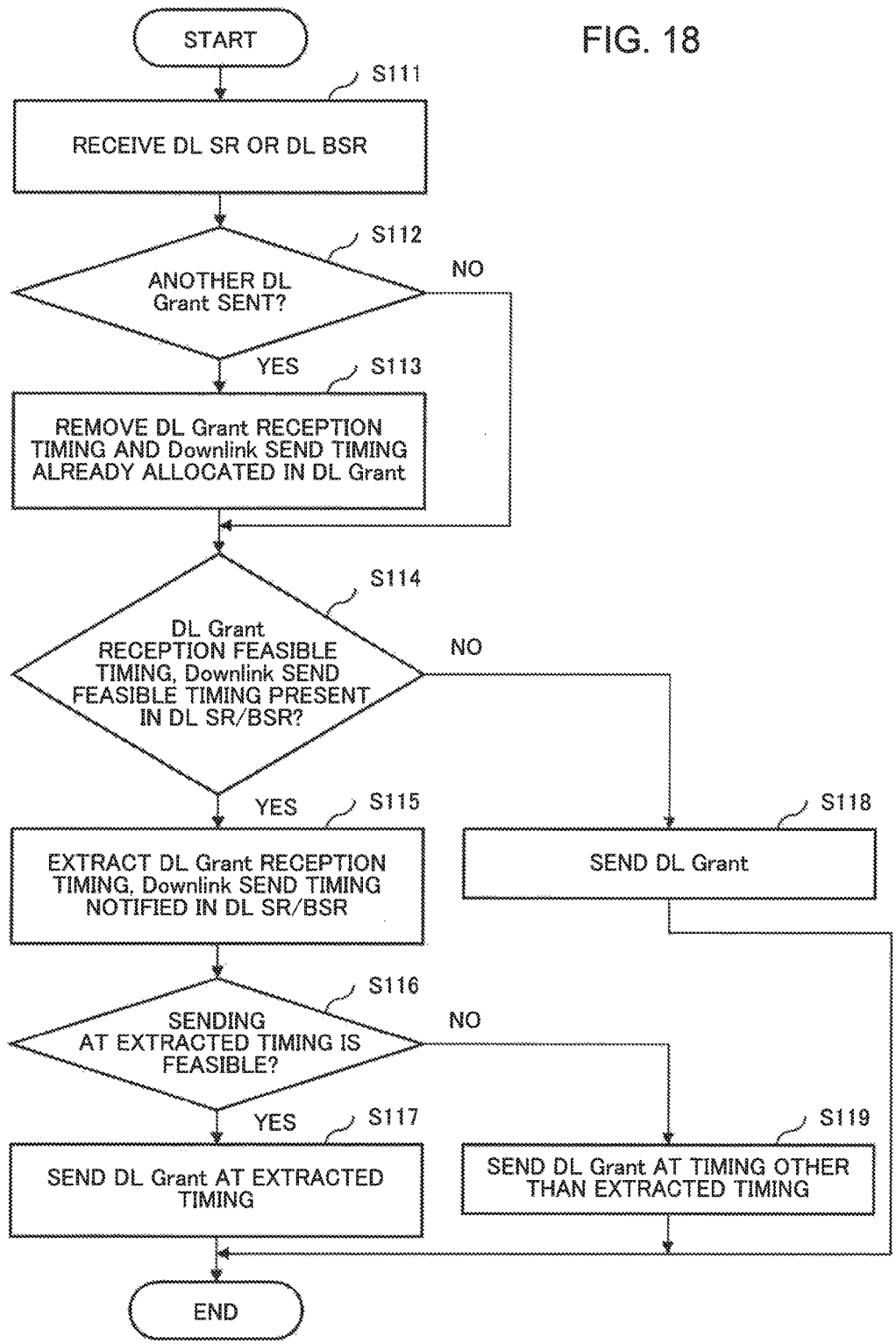
FIG. 18 is a flowchart for describing an example of transmission processing of a DL Grant in the RN illustrated in FIG. 14, in the communication method in the communication system illustrated in FIG. 14.

FIG. 18 is a flowchart for describing an example of the transmission processing of the DL Grant in the RN 205 illustrated in FIG. 14, in the communication method in the communication system illustrated in FIG. 14.

First, when the DL SR/BSR receiving unit 231 receives a DL SR or a DL BSR (step S111), it is determined whether the DL Grant transmission unit 238 has sent another DL Grant (step S112). For example, the DL Grant information accumulating unit 234 may determine whether the DL Grant transmission unit 238 has sent another DL Grant, based on whether the DL Grant information accumulating unit 234 has accumulated the reception timing information on the DL Grant already sent from the DL Grant transmission unit 238. Concretely, the DL Grant information accumulating unit 234 may determine that the DL Grant transmission unit 238 has sent another DL Grant, when the DL Grant information accumulating unit 234 has accumulated the reception timing information on the DL Grant already sent from the DL Grant transmission unit 238.

It is assumed that, in step S112, it is determined that the DL Grant transmission unit 238 has sent another DL Grant. In this case, the DL transmission/reception establishment timing extracting unit 235 removes the reception timing for the DL Grant and the send timing for the Downlink that have been already allocated in the DL Grant accumulated in the DL Grant information accumulating unit 234 (step S113).

On the other hand, when, in step S112, the DL Grant information accumulating unit 234 has not accumulated the DL Grant, the processing in step S113 is not performed.

Subsequently, the DL SR/BSR information accumulating unit 232 determines whether the DL SR/DL BSR received by the DL SR/BSR receiving unit 231 contains the DL Grant reception feasible timing and the Downlink send feasible timing (step S114). When the DL SR/DL BSR received by the DL SR/BSR receiving unit 231 contains the DL Grant reception feasible timing and the Downlink send feasible timing, the DL SR/BSR information accumulating unit 232 accumulates these timings. Then, the DL transmission/reception candidate timing extracting unit 233 extracts the DL Grant reception feasible timing and the Downlink send feasible timing accumulated in the DL SR/BSR information accumulating unit 232 (step S115).

Subsequently, the DL Grant establishment timing providing unit 236 determines whether the DL Grant can be sent at the timings extracted by the DL transmission/reception establishment timing extracting unit 235 and the DL transmission/reception candidate timing extracting unit 233 (step S116). When the DL Grant establishment timing providing unit 236 determines that the DL Grant can be sent at the extracted timings, the DL Grant establishment timing providing unit 236 provides these timings as the reception timing for the DL Grant and the send timing for the DL BSR/DL Data. Then, the DL Grant generation unit 237 generates the DL Grant based on the information provided by the DL Grant establishment timing providing unit 236. Subsequently, the DL Grant transmission unit 238 sends the DL Grant generated by the DL Grant generation unit 237 to the DeNB 104-1 (step S117).

On the other hand, it is assumed that, in step S114, the DL SR/DL BSR received by the DL SR/BSR receiving unit 231 does not contain the DL Grant reception feasible timing and the Downlink send feasible timing. In this case, the DL Grant generation unit 237 generates a DL Grant. Subsequently, the DL Grant transmission unit 238 sends the DL Grant generated by the DL Grant generation unit 237 to the DeNB 104-1 (step S118).

Furthermore, it is assumed that, in step S116, the DL Grant establishment timing providing unit 236 determines that the DL Grant cannot be sent at the extracted timings. In this case, the DL Grant establishment timing providing unit 236 provides timings other than these timings as a reception timing for the DL Grant and a send timing for the DL BSR/DL Data. Then, the DL Grant generation unit 237 generates a DL Grant based on the information provided by the DL Grant establishment timing providing unit 236. Subsequently, the DL Grant transmission unit 238 sends the DL Grant generated by the DL Grant generation unit 237 to the DeNB 104-1 (step S119).

Next, transmission processing of the DL Data in the DeNB 104-1 illustrated in FIG. 14 will be described.

Figure 19:
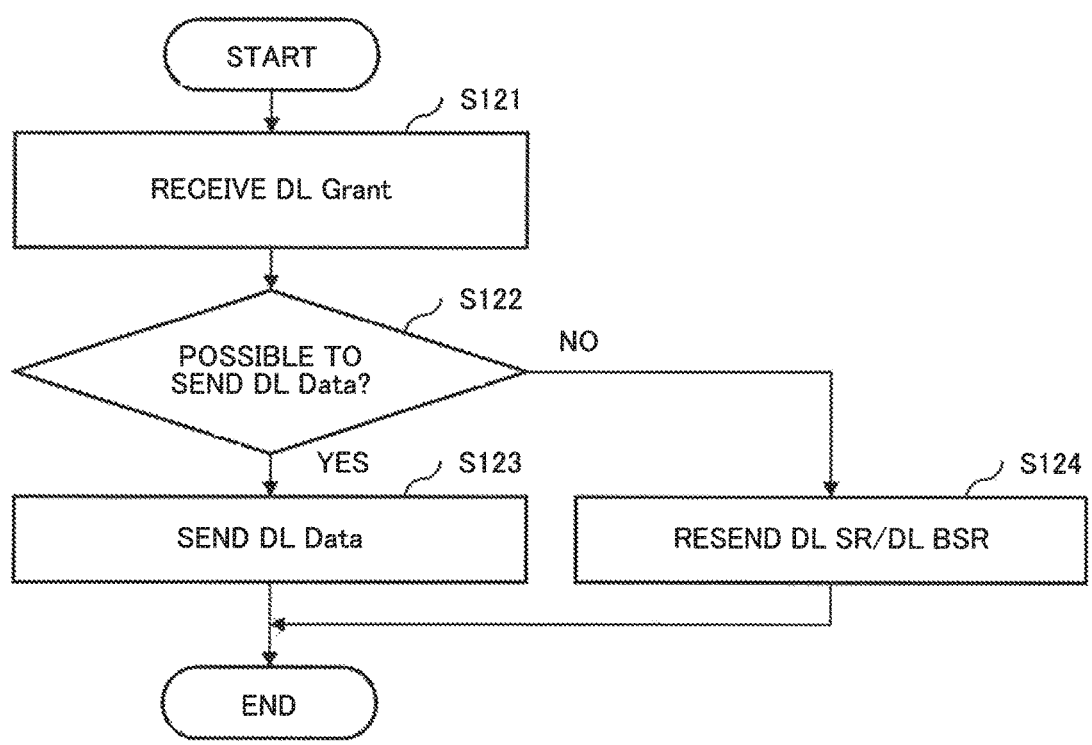
FIG. 19 is a flowchart for describing an example of transmission processing of a DL Data in the DeNB illustrated in FIG. 14, in the communication method in the communication system illustrated in FIG. 14.

FIG. 19 is a flowchart for describing an example of the transmission processing of the DL Data in DeNB 104-1 illustrated in FIG. 14, in the communication method in the communication system illustrated in FIG. 14.

First, when the DL Grant receiving unit 130 receives a DL Grant sent from the RN 205 (step S121), the DL Grant information accumulating unit 132 accumulates the timing information contained in the received DL Grant. Subsequently, the DL Data transmission feasibility determination unit 144 determines whether the DL Data can be sent, based on the timing information accumulated by the DL Grant information accumulating unit 132 (step S122). For example, the DL Data transmission feasibility determination unit 144 determines that the DL Data cannot be sent, when the timing information accumulated in the DL Grant information accumulating unit 132 is used for sending to another RN. When the DL Data transmission feasibility determination unit 144 determines that the DL Data can be sent at the timing received by the DL Grant receiving unit 130, the DL Data transmission unit 146 sends the DL Data to the RN 205 at that timing (step S123).

On the other hand, when, in step S122, the DL Data transmission feasibility determination unit 144 determines that the DL Data cannot be sent at the timing received by the DL Grant receiving unit 130, the SR/BSR retransmission processing unit 145 performs the retransmission processing of the DL SR/BSR (step S124).

Hereinafter, flow of data among the UEs 300-1 and 300-2, the RN 205, and the DeNBs 104-1 and 104-2 based on the foregoing processing will be described.

Figure 20:
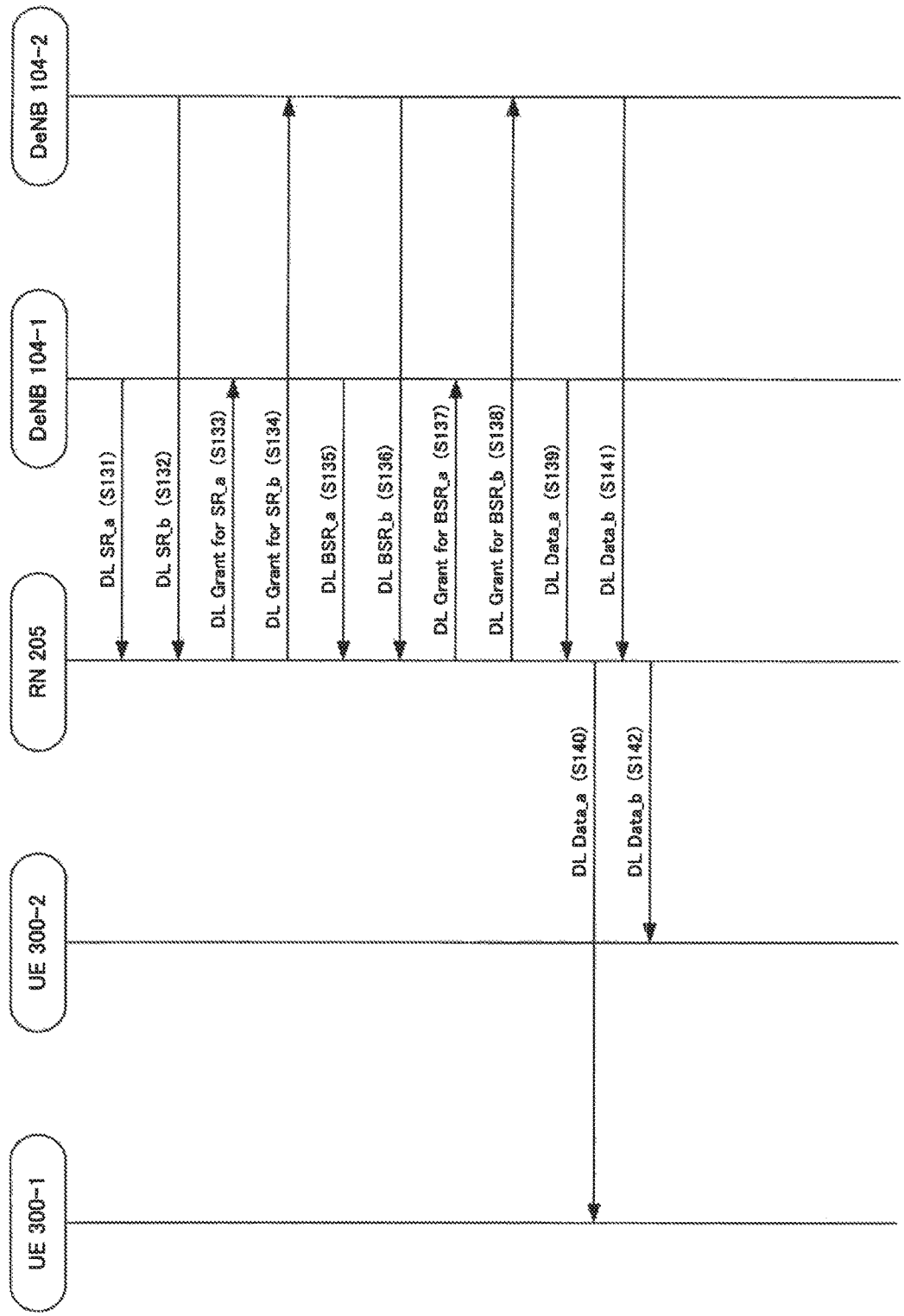
FIG. 20 is a sequence chart for describing an example of flow of data in the communication system illustrated in FIG. 14.
Figure 21:
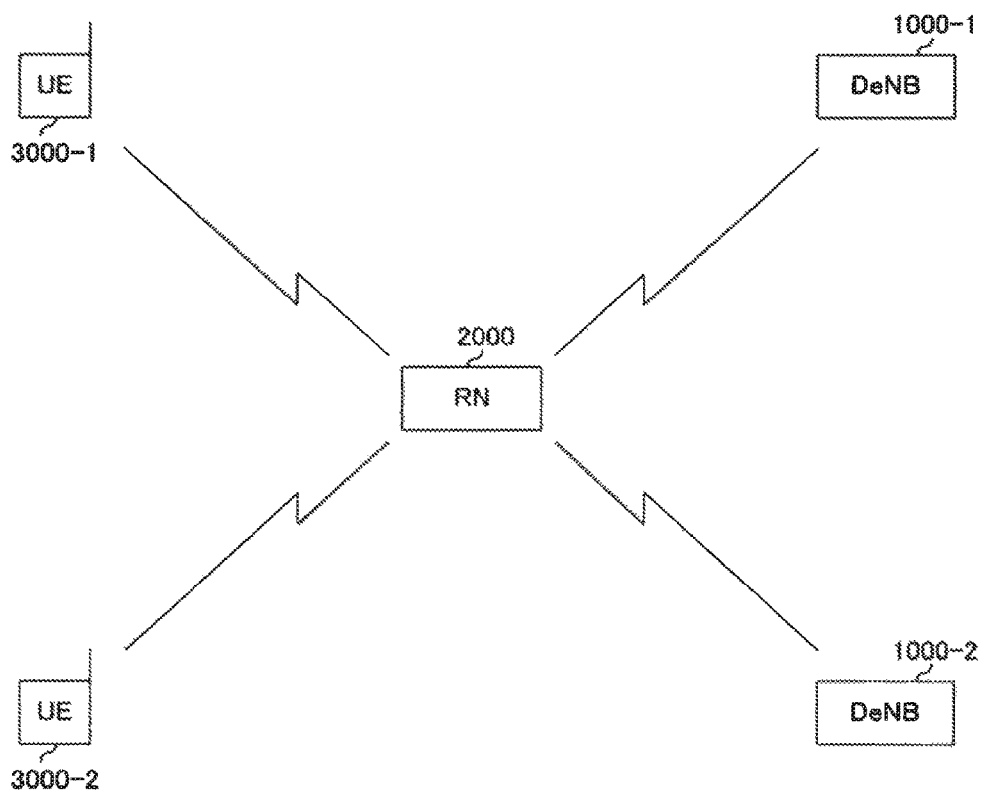
FIG. 21 is a diagram illustrating a form of a general radio communication system provided with a relay apparatus.
Figure 22:
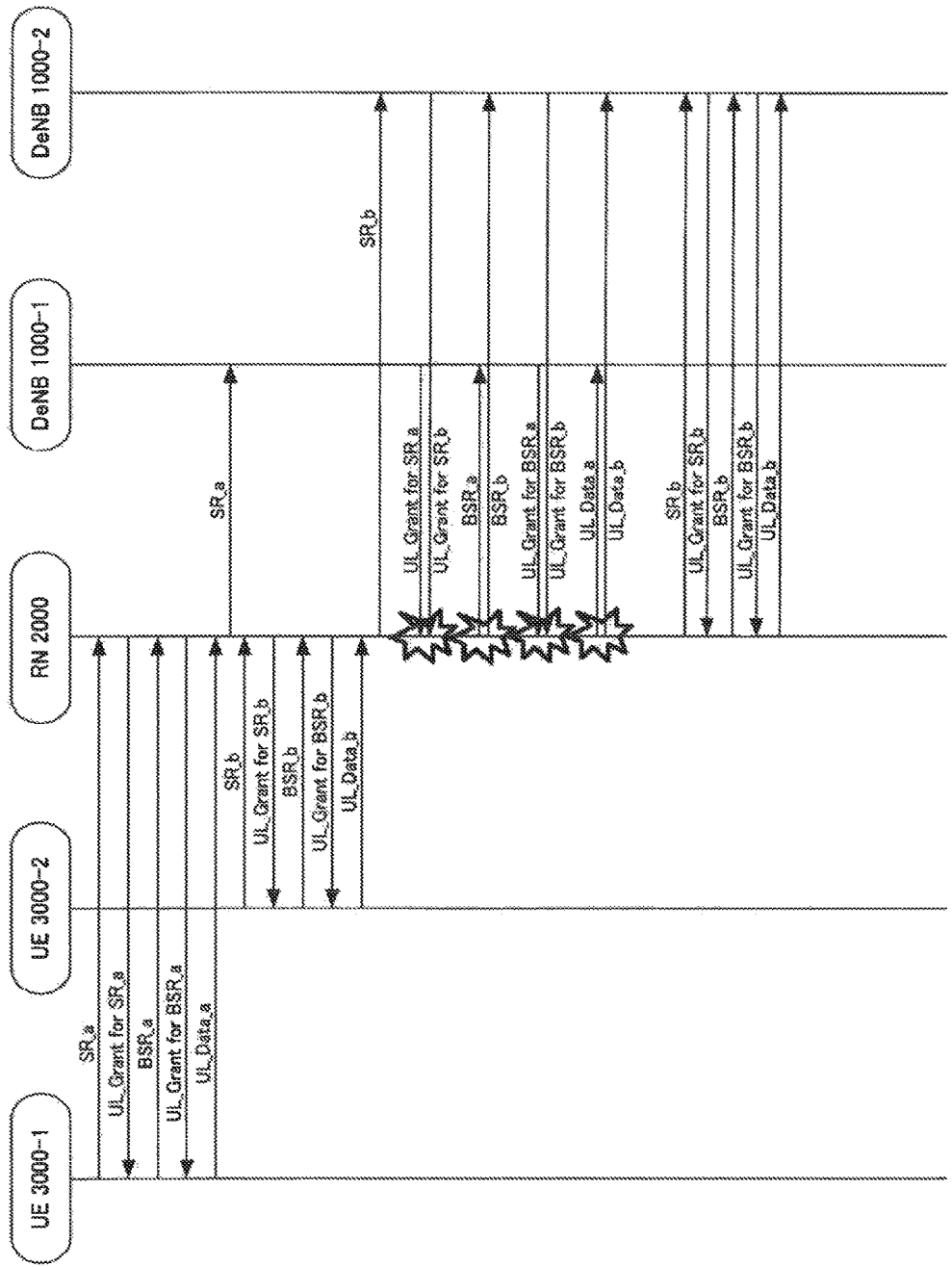
FIG. 22 is a sequence chart for describing an example of uplink data transmission processing in the radio communication system illustrated in FIG. 21.
Figure 23:
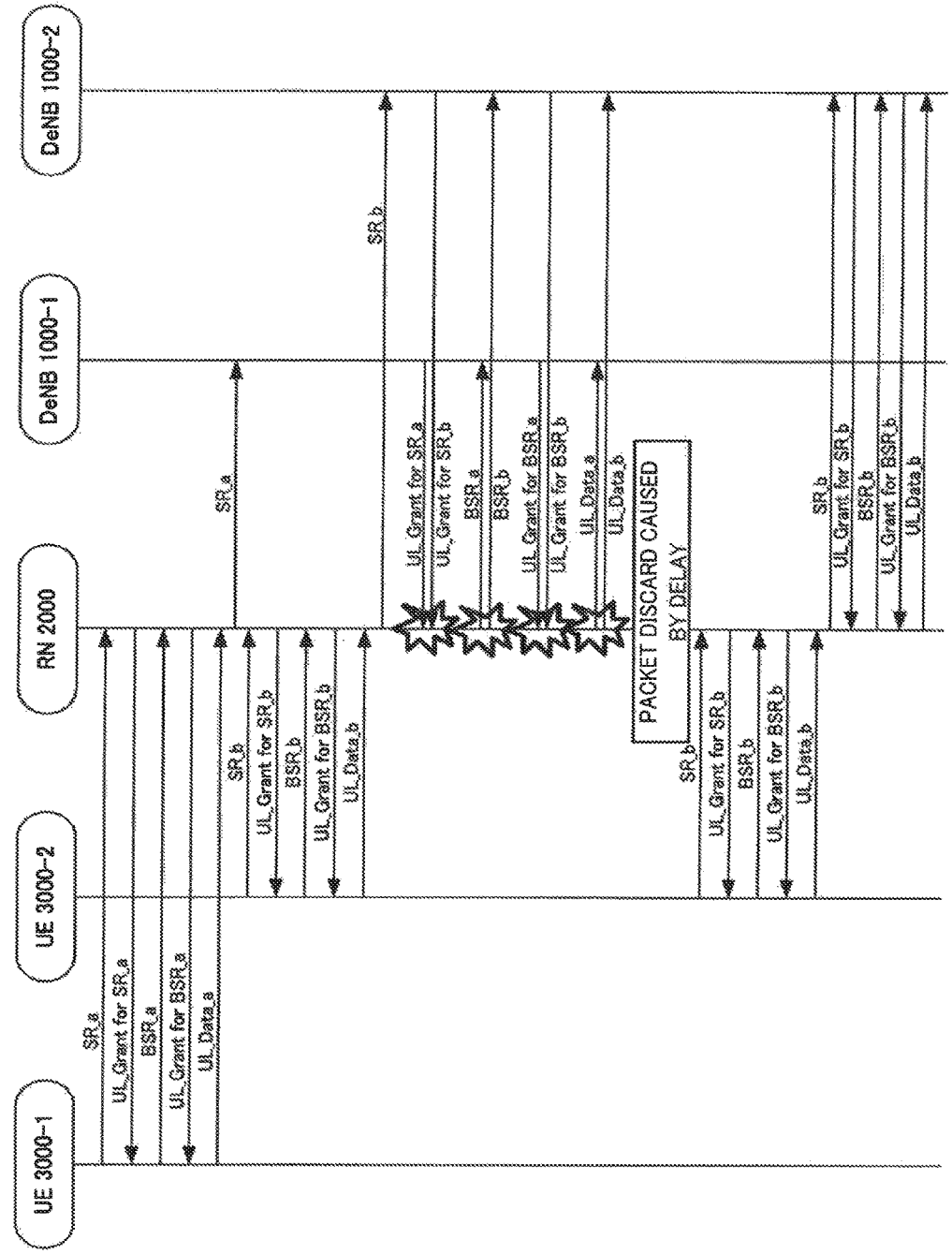
FIG. 23 is a sequence chart for describing another example of the uplink data transmission processing in the radio communication system illustrated in FIG. 21.
Figure 24:
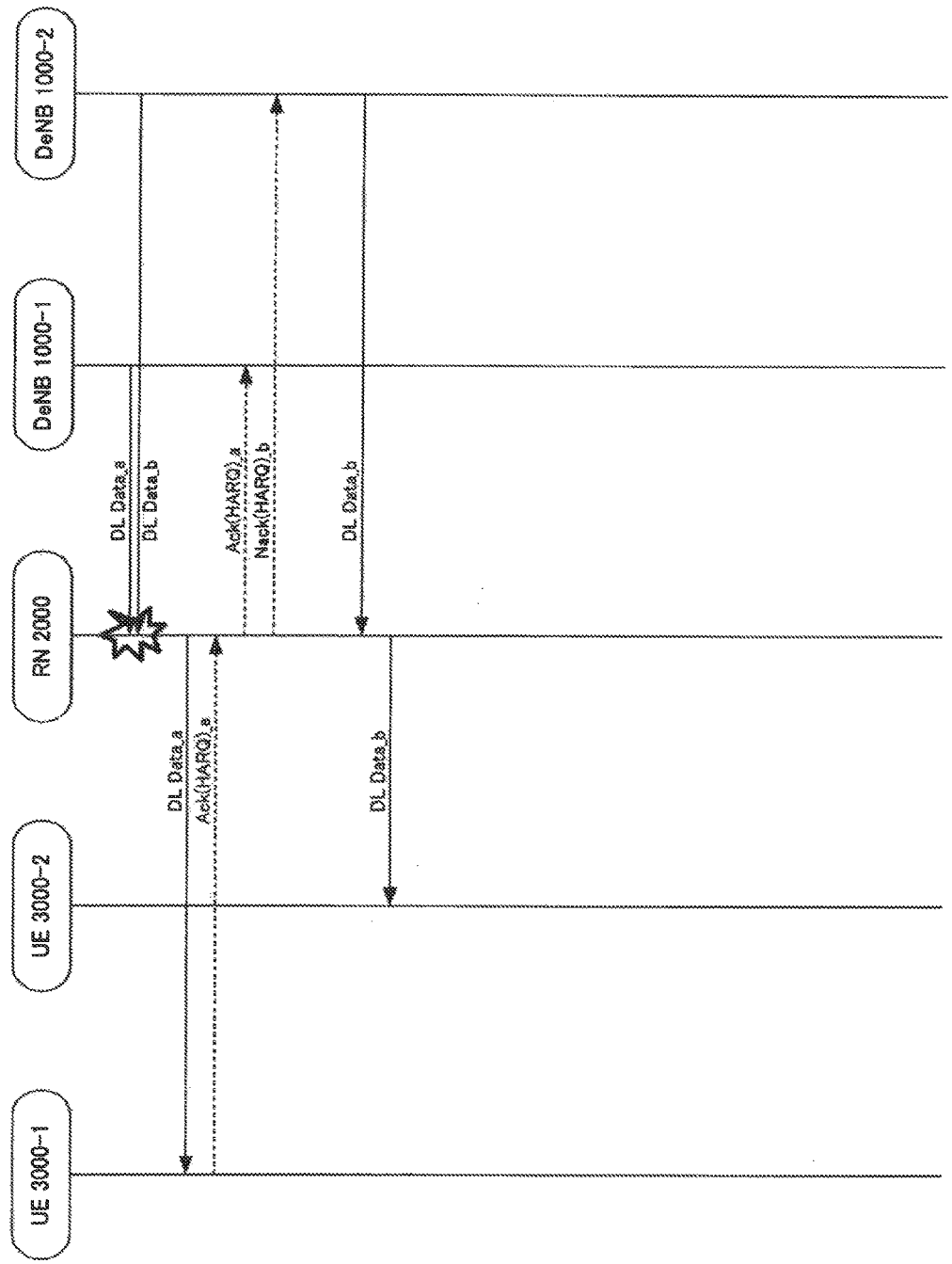
FIG. 24 is a sequence chart for describing an example of downlink data transmission processing in the radio communication system illustrated in FIG. 21.

FIG. 20 is a sequence chart for describing an example of the flow of data in the communication system illustrated in FIG. 14.

First, the DeNB 104-1, after receiving downlink data from a higher-order apparatus, such as an SGW, sends a DL SR_a to the RN 205 (step S131). At this time, the DeNB 104-1 sends the DL SR_a in which a timing at which the DL Grant for SR_a that is a response signal to the DL SR_a can be received and a timing at which the DL BSR_a can be sent are contained.

Furthermore, the DeNB 104-2, after receiving downlink data from a higher-order apparatus, such as SGW, sends a DL SR_b to the RN 205 (step S132). At this time, the DeNB 104-2 sends the DL SR_b in which a timing at which the DL Grant for SR_b that is a response signal to the DL SR_b can be received and a timing at which the DL BSR_b can be sent are contained.

Then, the RN 205 sends the DL Grant for SR_a, which is a response signal to the DL SR_a, to the DeNB 104-1 at the reception feasible timing contained in the DL SR_a sent from the DeNB 104-1 (step S133). Furthermore, the RN 205 sends the DL Grant for SR_b, which is a response signal to the DL SR_b, to the DeNB 104-2 at the reception feasible timing contained in the DL SR_b sent from the DeNB 104-2 (step S134).

Note that when the send timings for the DL Grant for SR_a and the DL Grant for SR_b are simultaneous, the DL Grants cannot be sent at the timings contained in the DL SR_a and the DL SR_b. In this case, the RN 205 may change the reception timings for the DL Grant for SR_a and the DL Grant for SR_b to timings other than the timings contained in the DL SR_a and the DL SR_b. In this case, the RN 205 may also change the send timings for the DL BSR_a and the DL BSR_b to different timings. Then, the RN 205 may generate the DL Grant for SR_a and the DL Grant for SR_b and sent them to the DeNB 104-1, based on these changed timings. These operations correspond to the processing in step S119 in FIG. 18.

Subsequently, the DeNB 104-1 sends the DL BSR_a to the RN 205 at the send feasible timing for the DL BSR_a that is contained in the DL SR_a that the DeNB 104-1 has sent (step S135). At this time, the DeNB 104-1 sends the DL BSR_a in which a reception feasible timing for a DL Grant for BSR_a that is a response signal to the DL BSR_a and a send feasible timing for the DL Data_a are contained. Furthermore, the DeNB 104-2 sends the DL BSR_b to the RN 205 at the send feasible timing for the DL BSR_b that is contained in the DL SR_b that the DeNB 104-2 has sent (step S136). At this time, the DeNB 104-2 sends the DL BSR_b in which a reception feasible timing for the DL Grant for BSR_b that is a response signal to the DL BSR_b and a send feasible timing for the DL Data_b are contained.

Then, the RN 205 sends the DL Grant for BSR_a, which is a response signal to the DL BSR_a, to the DeNB 104-1 at the reception feasible timing contained in the DL BSR_a sent from the DeNB 104-1 (step S137). Furthermore, the RN 205 sends the DL Grant for BSR_b, which is a response signal to the DL BSR_b, to the DeNB 104-2 at the reception feasible timing contained in the DL BSR_b sent from the DeNB 104-2 (step S138).

After that, the DeNB 104-1 sends the DL Data_a to the RN 205 at the send feasible timing for the DL Data_a contained in the DL BSR_a that has been sent (step S139). The RN 205, after receiving the DL Data_a sent from the DeNB 104-1, sends the DL Data_a to the UE 300-1 (step S140).

Furthermore, the DeNB 104-2 sends the DL Data_b to the RN 205 at the send feasible timing for the DL Data_b contained in the DL BSR_b that has been sent (step S141). The RN 205, after receiving the DL Data_b sent from the DeNB 104-2, sends the DL Data_b to the UE 300-2 (step S142).

Thus, each of the DeNBs 104-1 and 104-2 notifies the RN 205 of a timing at which the DeNB can receive a response signal and a timing at which the DeNB can send downlink data and then, at these timings, sends the request signal and the downlink data to the RN 205. Therefore, the communication system of the fourth example embodiment can be prevent failure in the reception processing of the response signal and failure in the transmission processing of the downlink data and therefore can make data transmission more efficient.

Note that, as a modification, a system combining the third example embodiment and the fourth example embodiment is also permissible.

Advantageous effects of the example embodiments will be stated below.

A first advantageous effect is that because of having the functions of sending and receiving the DL SR, the DL BSR, and the DL Grant, the example embodiments can negotiate the timing to send DL Data not only with higher-order radio base station apparatuses but also with lower-order radio relay base station apparatuses. Furthermore, the DL SR and the DL BSR can be provided with a send feasible timing for the next Downlink communication (DL BSR and DL Data) and a reception timing for the DL Grant.

A reason for that is that the negotiation for the timing to send DL Data between nodes makes it possible to prevent DL Data from being received at the same timing.

A second advantageous effect is that the UL SR and the UL BSR are provided with a send feasible timing for the next Uplink communication (UL BSR and UL Data) and a reception timing for a UL Grant.

A reason for that is that the negotiation for the timing to send UL Data between nodes makes it possible to prevent UL Data from being received at the same timing.

A third advantageous effect is that, using the DL opposing node determination unit, it can be determined whether to perform a method of sending DL Data as in the related art or the sending of a DL SR or the like, according to an opposing node.

A reason for that is that because while a radio relay base station apparatus has a plurality of higher-order radio base station apparatuses, communication with a radio communication terminal involves a DeNB or a higher-order RN that is uniquely determined, an unnecessary radio scheduling function can be excluded.

A fourth advantageous effect is that, using the UL opposing node determination unit, it can be determined whether to perform a method of sending UL Data as in the related art or the sending of a UL SR or the like, according to an opposing node.

A reason for that is that because while a radio relay base station apparatus has a plurality of higher-order radio base station apparatuses, communication with an SGW or the like involves a high-order node that is uniquely determined, an unnecessary radio scheduling function can be excluded.

As an example of application of the present invention, the case of sharing a radio base station apparatus in an MVNO (Mobile Virtual Network Operator) system or the like among a plurality of operators and performing the RAN (Radio Access Network) sharing including RNs will lead a better radio resource.

A part or the entirety of the foregoing example embodiments can be described as in the following supplementary notes but not limited to the following.

(Supplementary Note 1) A radio relay station that includes a transmission unit that notifies a radio base station of a timing at which uplink data sent from a communication terminal are able to be sent to the radio base station and then sends the uplink data to the radio base station.

(Supplementary Note 2) The radio relay station according to supplementary note 1, wherein the transmission unit includes an uplink scheduling request signal transmission unit that sends to the radio base station an uplink scheduling request signal for sending to the radio base station the uplink data sent from the communication terminal, after containing, in the uplink scheduling request signal, information that indicates a timing at which a response signal to the uplink scheduling request signal is able to be received and information that indicates a timing at which an uplink buffer status-reporting signal is able to be sent to the radio base station, and an uplink buffer status-reporting signal transmission unit that receives the response signal to the uplink scheduling request signal and then sends to the radio base station the uplink buffer status-reporting signal after containing, in the uplink buffer status-reporting signal, information that indicates a timing at which a response signal to the uplink buffer status-reporting signal is able to be received and information that indicates a timing at which the uplink data are able to be sent to the radio base station.

(Supplementary Note 3) A radio base station that includes a transmission unit that notifies a radio relay station that relays communication with communication terminals of a timing at which downlink data are able to be sent to the radio relay station and then sends the downlink data to the radio relay station.

(Supplementary Note 4) The radio base station according to supplementary note 3, wherein the transmission unit includes a downlink scheduling request signal transmission unit that sends to the radio relay station a downlink scheduling request signal for sending the downlink data to the radio relay station, after containing, in the downlink scheduling request signal, information that indicates a timing at which a response signal to the downlink scheduling request signal is able to be received and information that indicates a timing at which a downlink buffer status-reporting signal is able to be sent to the radio relay station, and a downlink buffer status-reporting signal transmission unit that receives the response signal to the downlink scheduling request signal and then sends the downlink buffer status-reporting signal to the radio relay station after containing, in the downlink buffer status-reporting signal, information that indicates a timing at which a response signal to the downlink buffer status-reporting signal is able to be received and information that indicates a timing at which the downlink data are able to be sent to the radio relay station.

(Supplementary Note 5) In a communication system that includes a radio base station and a radio relay station that relays communication between the radio base station and a communication terminal, a communication system in which the radio relay station includes a transmission unit that notifies the radio base station of a timing at which uplink data sent from the communication terminal are able to be sent to the radio base station and then sends the uplink data to the radio base station.

(Supplementary Note 6) In a communication system that includes a radio base station and a radio relay station that relays communication between the radio base station and a communication terminal, a communication system in which the radio base station includes a transmission unit that notifies the radio relay station of a timing at which downlink data are able to be sent to the radio relay station and then sends the downlink data to the radio relay station.

(Supplementary Note 7) A communication method that performs processing of notifying a radio base station of a timing at which uplink data sent from a communication terminal are able to be sent to the radio base station and then sending the uplink data to the radio base station.

(Supplementary Note 8) A communication method that performs processing of notifying a radio relay station that relays communication between communication terminals of a timing at which downlink data are able to be sent to the radio relay station and then sending the downlink data to the radio relay station.

(Supplementary Note 9) In a communication method in a communication system that includes a radio base station and a radio relay station that relays communication between the radio base station and a communication terminal, a communication method in which the radio relay station performs processing of notifying the radio base station of a timing at which uplink data sent from the communication terminal are able to be sent to the radio base station and then sending the uplink data to the radio base station.

(Supplementary Note 10) In a communication method in a communication system that includes a radio base station and a radio relay station that relays communication between the radio base station and a communication terminal, a communication method in which the radio base station performs processing of notifying the radio relay station of a timing at which downlink data are able to be sent to the radio relay station and then sending the downlink data to the radio relay station.

(Supplementary Note 11) The radio relay station according to supplementary note 2, which sends an uplink signal to the radio base station by using a communication method of a SC-FDMA (Single Carrier-Frequency Division Multiple Access) or a TD-SCDMA (Time Division-Synchronous Code Division Multiple Access).

(Supplementary Note 12) The radio base station according to supplementary note 4, which sends downlink signal to the radio relay station by using an orthogonal frequency-division multiplexing access method.

While the invention of the present application has been described above with reference to example embodiments, the invention of the present application is not limited to the foregoing example embodiments. The structure and details of the invention of the present application can be changed in various manner that can be understood within the scope of the invention of the present application by a person with ordinary skill in the art.

This application claims the benefit of the priority based on Japanese Patent Application No. 2014-210873 filed on Oct. 15, 2014, the disclosure of which is incorporated herein in its entirety.

REFERENCE SIGNS LIST 100, 101, 103-1, 103-2, 104-1, 104-2 DeNB
102, 105, 201, 204 Transmission unit
110 UL SR/BSR receiving unit
111 UL SR/BSR information accumulating unit
112 UL Transmission/reception candidate timing extracting unit
113 UL Grant information accumulating unit
114 UL Transmission/reception establishment timing extracting unit
115 UL opposing node determination unit
116 UL Grant establishment timing providing unit
117 UL Grant generation unit
118 UL Grant transmission unit
130 DL Grant receiving unit
131 DL Data receiving unit
132 DL Grant information accumulating unit
133 DL SR/BSR information accumulating unit
134 DL Transmission establishment timing extracting unit
135 DL Transmission/reception candidate timing extracting unit
136 DL opposing node determination unit
137 DL opposing node flag providing unit
138 DL transmission/reception feasible timing candidate providing unit
139 DL SR/BSR determination unit
140 DL BSR generating unit
141 DL BSR transmission unit
142 DL SR generating unit
143 DL SR transmission unit
144 DL Data transmission feasibility determination unit
145, 225 SR/BSR retransmission processing unit
146 DL Data transmission unit
200, 202, 203, 205 RN
210 UL Grant receiving unit
211 UL Data receiving unit
212 UL Grant information accumulating unit
213 UL SR/BSR information accumulating unit
214 UL transmission establishment timing extracting unit
215 UL transmission/reception candidate timing extracting unit
216 UL opposing node determination unit
217 UL opposing node flag providing unit
218 UL transmission/reception feasible timing candidate providing unit
219 UL SR/BSR determination unit
220 UL BSR generating unit
221 UL BSR transmission unit
222 UL SR generating unit
223 UL SR transmission unit
224 UL Data transmission feasibility determination unit
226 UL Data transmission unit
231 DL SR/BSR receiving unit
232 DL SR/BSR information accumulating unit
233 DL transmission/reception candidate timing extracting unit
234 DL Grant information accumulating unit 235 DL transmission/reception establishment timing extracting unit
236 DL Grant establishment timing providing unit
237 DL Grant generation unit
238 DL Grant transmission unit
300, 300-1, 300-2 UE

What is claimed is:

1. A radio relay station comprising:
a transmission circuit that notifies a radio base station of a timing at which uplink data sent from a communication terminal are able to be sent to the radio base station and then sends the uplink data to the radio base station, wherein
the transmission circuit includes:
an uplink scheduling request signal transmission circuit that sends, to the radio base station, an uplink scheduling request signal for sending, to the radio base station, uplink data sent from the communication terminal, after containing, in the uplink scheduling request signal, information that indicates a timing at which a response signal to the uplink scheduling request signal is able to be received and information that indicates a timing at which an uplink buffer status-reporting signal is able to be sent to the radio base station; and
an uplink buffer status-reporting signal transmission circuit that receives a response signal to the uplink scheduling request signal and then sends, to the radio base station, the uplink buffer status-reporting signal after containing, in the uplink buffer status-reporting signal, information that indicates a timing at which a response signal to the uplink buffer status-reporting signal is able to be received and information that indicates a timing at which the uplink data are able to be sent to the radio base station.

2. A radio base station comprising:
a transmission circuit that notifies a radio relay station that relays communication with a communication terminal of a timing at which downlink data are to be sent to the radio relay station and then sends the downlink data to the radio relay station, wherein
the transmission circuit includes:
a downlink scheduling request signal transmission circuit that sends, to the radio relay station, an downlink scheduling request signal for sending downlink data to the radio relay station, after containing, in the downlink scheduling request signal, information that indicates a timing at which a response signal to the downlink scheduling request signal is able to be received and information that indicates a timing at which a downlink buffer status-reporting signal is able to be sent to the radio relay station; and
a downlink buffer status-reporting signal transmission circuit that receives a response signal to the downlink scheduling request signal and then sends the downlink buffer status-reporting signal to the radio relay station after containing, in the downlink buffer status-reporting signal, information that indicates a timing at which a response signal to the downlink buffer status-reporting signal is able to be received and information that indicates a timing at which the downlink data are able to be sent to the radio relay station.

3. A communication method of a radio relay station that relays communication with a communication terminal comprising:
performing processing of notifying a radio base station of a timing at which uplink data sent from a communication terminal are able to be sent to the radio base station and then sending the uplink data to the radio base station, wherein
the processing of notifying step includes:
sending, to the radio base station, an uplink scheduling request signal for sending, to the radio base station, uplink data sent from the communication terminal, after containing, in the uplink scheduling request signal, information that indicates a timing at which a response signal to the uplink scheduling request signal is able to be received and information that indicates a timing at which an uplink buffer status-reporting signal is able to be sent to the radio base station; and
receiving a response signal to the uplink scheduling request signal and then sending, to the radio base station, the uplink buffer status-reporting signal after containing, in the uplink buffer status-reporting signal, information that indicates a timing at which a response signal to the uplink buffer status-reporting signal is able to be received and information that indicates a timing at which the uplink data are able to be sent to the radio base station.

4. The radio relay station according to claim 1, wherein
the radio relay station sends an uplink signal to the radio base station by using a communication method of a SC-FDMA (Single Carrier-Frequency Division Multiple Access) or TD-SCDMA (Time Division-Synchronous Code Division Multiple Access).

5. The radio base station according to claim 2, wherein
the radio base station sends downlink signal to the radio relay station by using an orthogonal frequency-division multiplexing access method.

* * * * *